United States Patent
Shibuya et al.

(10) Patent No.: US 6,916,762 B2
(45) Date of Patent: Jul. 12, 2005

(54) CATALYST FOR FLUIDIZED CATALYTIC CRACKING OF HEAVY HYDROCARBON OIL AND METHOD OF FLUIDIZED CATALYTIC CRACKING

(75) Inventors: Tadashi Shibuya, Satte (JP); Junko Naito, Satte (JP); Hidenori Yamada, Satte (JP); Nobuki Sekine, Satte (JP)

(73) Assignees: Petroleum Energy Center, Tokyo (JP); Cosmo Oil Co., Ltd., Tokyo (JP)

( * ) Notice: Subject to any disclaimer, the term of this patent is extended or adjusted under 35 U.S.C. 154(b) by 0 days.

(21) Appl. No.: 10/362,288

(22) PCT Filed: Aug. 27, 2001

(86) PCT No.: PCT/JP01/07315

§ 371 (c)(1),
(2), (4) Date: Feb. 25, 2003

(87) PCT Pub. No.: WO02/18044

PCT Pub. Date: Mar. 7, 2002

(65) Prior Publication Data

US 2004/0035750 A1 Feb. 26, 2004

(30) Foreign Application Priority Data

Aug. 28, 2000 (JP) ...................................... 2000-257669
Aug. 14, 2001 (JP) ...................................... 2001-246232

(51) Int. Cl.$^7$ .......................... B01J 29/00; B01J 21/18; B01J 21/20; B01J 27/20
(52) U.S. Cl. .......................... 502/174; 502/60; 502/63; 502/69; 502/73; 423/700; 423/419.1; 423/420.2; 423/421; 423/430
(58) Field of Search .......................... 502/174, 60, 63, 502/69, 73; 423/700, 419.1, 420.2, 421, 430

(56) References Cited

U.S. PATENT DOCUMENTS

| | | | |
|---|---|---|---|
| 4,238,362 A | 12/1980 | Bertus et al. | |
| 4,377,494 A | 3/1983 | Bertus et al. | |
| 4,707,461 A | 11/1987 | Mitchell et al. | |
| 4,944,864 A | 7/1990 | Kugler | |
| 4,988,654 A | 1/1991 | Kennedy et al. | |
| 4,990,240 A | 2/1991 | Pasek et al. | |

OTHER PUBLICATIONS

International Search Report for PCT/JP01/07315 dated Nov. 27, 2001.

European Search Report dated Feb. 25, 2004.

*Primary Examiner*—Elizabeth D. Wood
(74) *Attorney, Agent, or Firm*—Sughrue Mion, PLLC

(57) ABSTRACT

An FCC catalyst which not only deactivates catalyst poison metals, such as nickel, vanadium and the like, in feedstock oils, inhibits the generation of hydrogen or coke, has excellent cracking activity and bottom oil-treating ability, and can yield a gasoline and LCO fraction in high yields, but also retains the performances on a high level over long and has an improved catalyst life; and an FCC method using the catalyst. The FCC catalyst has a compound of a bivalent metal or of bivalent and trivalent metals showing an XRD pattern of a carbonate of the bivalent metal; an inorganic oxide matrix and the compound dispersed therein; or an inorganic oxide matrix and the compound dispersed therein together with a crystalline aluminosilicate zeolite, and relates to an FCC method in which at least one of the catalysts are used in combination with an FCC catalyst obtained by evenly dispersing a crystalline aluminosilicate zeolite in an inorganic oxide matrix.

3 Claims, 8 Drawing Sheets

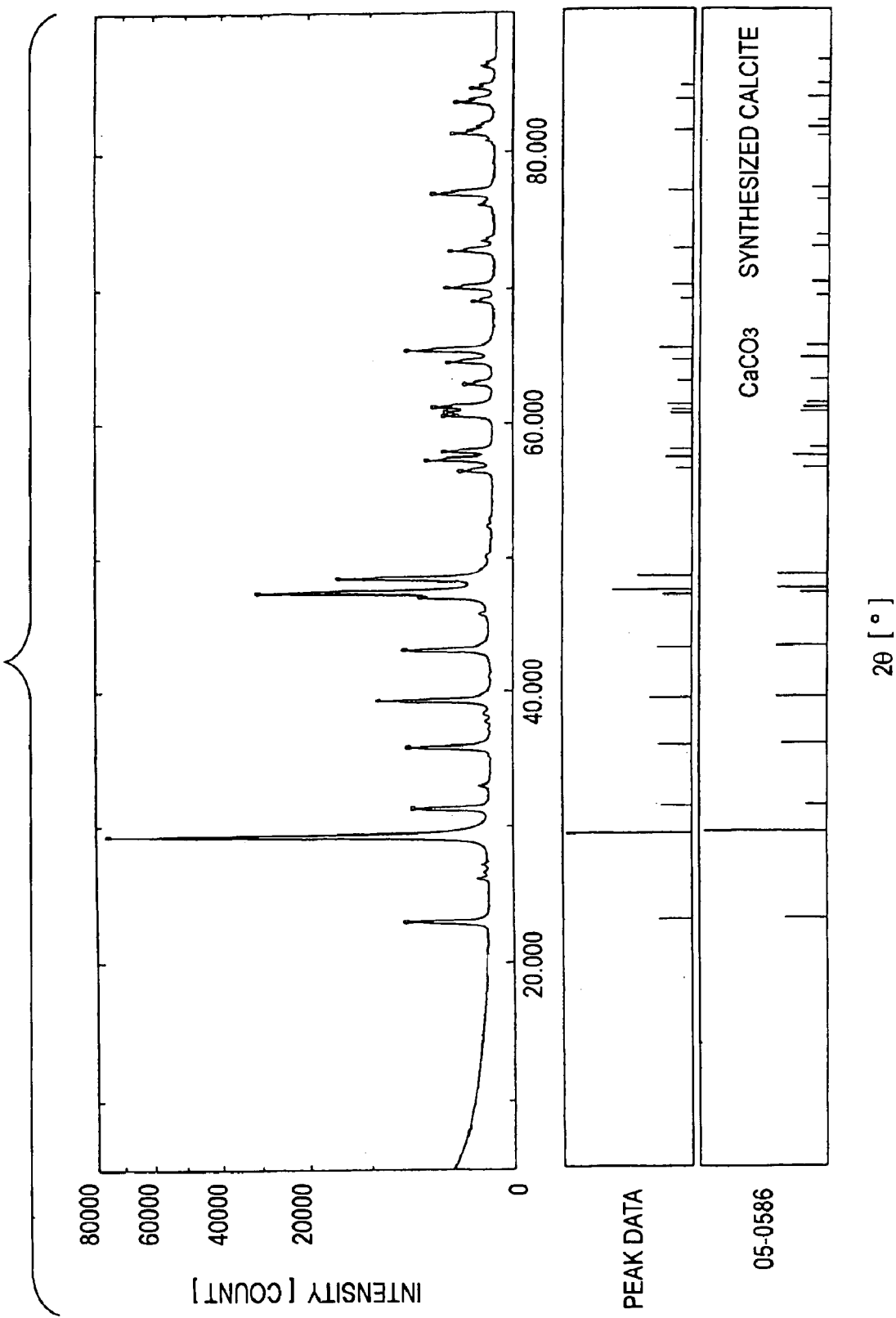

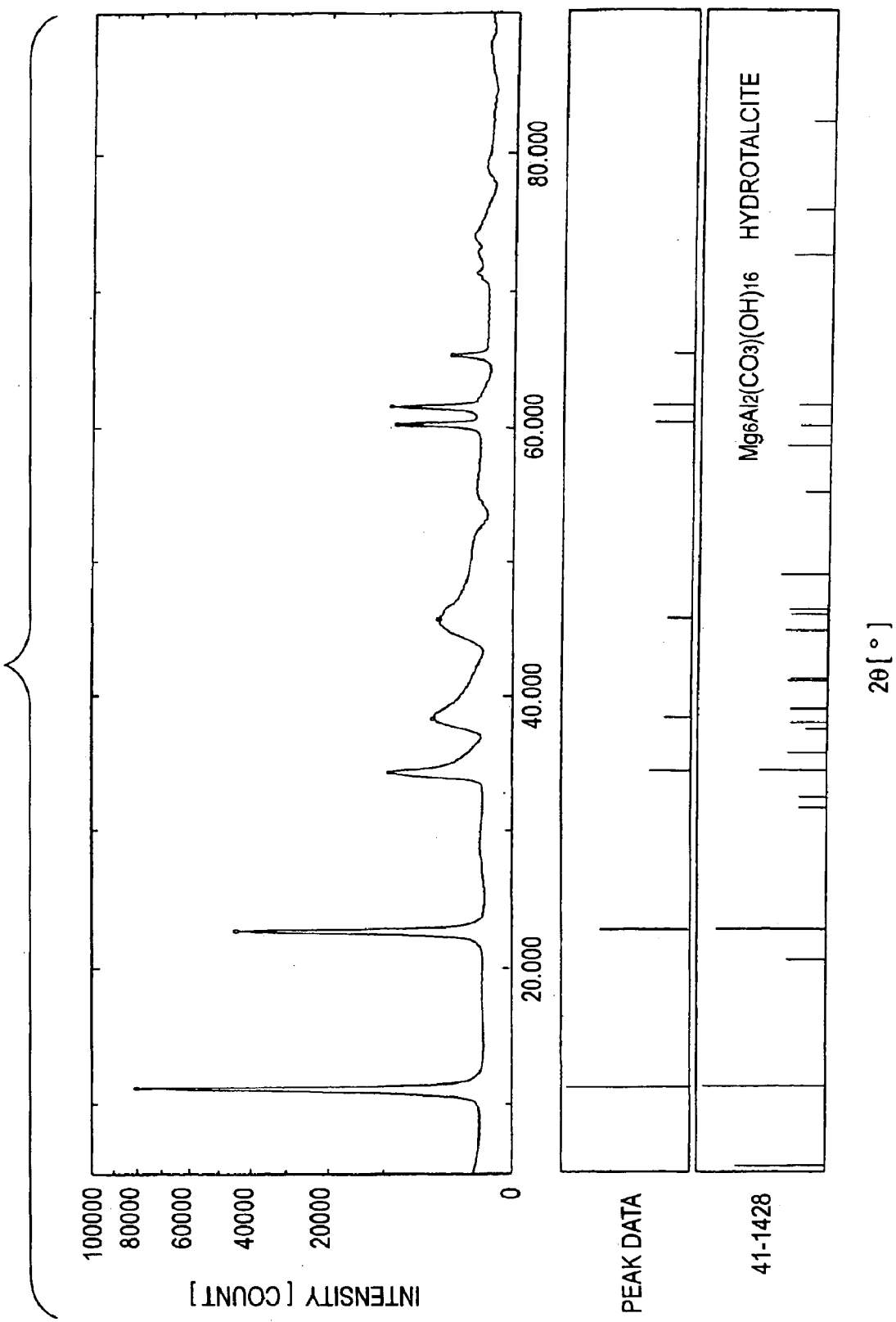

CATALYST FOR FLUIDIZED CATALYTIC CRACKING OF HEAVY HYDROCARBON OIL AND METHOD OF FLUIDIZED CATALYTIC CRACKING

TECHNICAL FIELD

The present invention relates to a catalyst for fluidized catalytic cracking (hereinafter sometimes referred to as "FCC") of a heavy hydrocarbon oil and a method of FCC of the oil with the catalyst. More particularly, the present invention relates to a highly durable FCC catalyst which not only deactivates catalyst poison metals contained in the oil, e.g., nickel and vanadium, is reduced in the amount of hydrogen or coke yielded, has excellent cracking activity and bottom oil-treating ability, and can yield a gasoline and an LCO fraction in high yields without lowering the octane number, but also can retain these performances on a high level over long periods of time, and relates to an FCC method using the catalyst.

BACKGROUND ART

Recently, in the catalytic cracking of hydrocarbon oils, there is a desire to upgrade a less expensive feedstock hydrocarbon oil of lower quality, while there is an increasingly growing tendency for feedstock hydrocarbon oils to become heavier.

Heavy feedstock hydrocarbon oils contain a large amount of metals such as nickel, vanadium and the like, and the metals almost wholly deposit on the catalyst.

In particular, it is known that when vanadium deposits and accumulates on the catalyst, it destroys the crystal structure of the crystalline aluminosilicate zeolite which is an active ingredient of the catalyst and therefore a considerable decrease in catalytic activity is brought out and the amount of hydrogen and coke yielded is increased.

On the other hand, it is known that nickel causes catalytic dehydrogenation upon deposition and accumulation on the catalyst surface and therefore increases the amount of hydrogen and coke yielded and, as a result, nickel causes problems, for example, that the regeneration tower temperature is elevated.

When a feedstock hydrocarbon oil containing a large amount of a heavy bottom oil (e.g., topping residue or vacuum distillation residue) is used, not only does the influence of the metals become greater but also the sulfur compounds contained in the bottom oil cause a problem that the amount of $SO_x$ in the flue gas from a catalyst regeneration tower increases and a product oil fraction, in particular a gasoline, has an increased sulfur concentration.

Furthermore, increase of the treated amount of bottom oils leads to an increase in catalyst makeup amount and causes problems relating to increase in catalyst cost and load imposed on the environment due to an increase in the amount of waste catalysts.

Up to now, in order to deactivate poison metals such as vanadium or the like to be deposited on a catalyst to thereby improve the metal resistance of the catalyst, various techniques which incorporate a basic compound or the like as a metal deactivator into the catalyst have been proposed. Examples include a technique in which a water-soluble compound of an alkaline earth metal or the like is ion-exchanged with a zeolite or inorganic oxide matrix and a technique in which a water-insoluble oxide (e.g., dolomite, sepiolite, anion clay, or the like) is incorporated into an inorganic oxide matrix (JP-A-62-57652, JP-A-63-182031, JP-A-3-293039, etc.).

Although the compounds of alkaline earth metals have the effect of deactivating poison metals, they have no cracking ability when used alone. Consequently, they are used after having been incorporated as a metal deactivator into an inorganic oxide matrix having a cracking ability, as described above. However, in the catalyst, since the alkaline earth metal (especially a magnesium compound or the like) moves in the form of a low-melting compound during catalytic cracking reactions and the basic nature thereof destroys the crystal structure of the crystalline aluminosilicate zeolite, the thermal stability is reduced.

The catalyst described above obtained by incorporating a compound of an alkaline earth metal into a crystalline aluminosilicate zeolite through ion exchange has problems, for example, that the gasoline product obtained through catalytic cracking reactions has a reduced octane number (RON).

Furthermore, when anion clay or the like is used, the clay naturally occurring is rare and hence greatly raises the catalyst cost, while synthetic products of the clay also are not inexpensive, resulting also in an increased catalyst cost.

In addition, when a compound of an alkaline earth metal is dispersed as a metal deactivator in an inorganic oxide matrix, the pH of the catalyst slurry fluctuates considerably due to the basic nature of the compound so that it is difficult to produced the catalyst.

In particular, magnesium compounds dissolve away in the step of catalyst washing with ammonia, an aqueous ammonium sulfate solution or the like (removal of an alkali metal such as sodium or potassium from the catalyst). It is hence difficult to wash catalysts containing magnesium, and the incorporation thereof into catalysts is problematic.

On the other hand, an additional advantage of the catalyst compositions described above having the effect of trapping vanadium is that they have $SO_x$-binding ability (see U.S. Pat. No. 4,889,615, etc.). The ability is effective in diminishing $SO_x$ in the discharge gas from a regeneration tower and reducing the sulfur content of a product oil.

Heavy hydrocarbon oils, in particular, have a high sulfur content, and the sulfur compounds deposit on the catalyst together with coke and become $SO_x$ in the regeneration tower of the FCC apparatus. $SO_x$ reacts with the basic metal oxide and is thus trapped in the catalyst. The sulfur thus trapped can be separated and recovered after it is converted to hydrogen sulfide through reactions in the riser. It is known that the catalyst compositions thus diminish $SO_x$ in the combustion gas and reduce the sulfur content in the product oil.

However, when nickel accumulates on the catalyst surface, there are often cases where the metal deactivator described above has no deactivating effect on the nickel. Accordingly, a technique of feeding a specific antimony compound (organoantimony, etc.) to a feedstock hydrocarbon oil to thereby deactivate the nickel deposited on the catalyst surface has been proposed (JP-A-63-63688, JP-A-1-213399, etc).

However, the antimony compound accumulates as a metallic antimony deposit (low-melting compound having a melting point of from 500 to 700° C.) on the control valve and the like in the FCC apparatus.

DISCLOSURE OF THE INVENTION

In view of the various points described above, an object of the present invention is to provide an FCC catalyst of the highly durable type (having a life at least twice higher than the life of standard catalysts) into which a metal deactivator can be incorporated without lowering the catalytic activity and which not only efficiently deactivates catalyst poison metals contained in heavy feedstock hydrocarbons contained in feedstock oils, is reduced in the amount of hydrogen or coke yielded, has excellent cracking activity and bottom oil-treating ability, and can yield a gasoline and an LCO fraction in high yields without lowering the octane number, but also can retain these performances on a high level over long.

The present inventors made intensive investigations in order to accomplish the object. As a result, it has been found that when a specific carbonate selected from crystalline metal carbonates comprising a bivalent metal and crystalline metal carbonates comprising a bivalent metal and a trivalent metal is used as a metal deactivator, then (a) catalyst poison metals contained in a feedstock oil, such as nickel, vanadium and the like, can be efficiently deactivated, (b) a catalyst can be prepared regardless of the kind of the inorganic oxide matrix as a binder and the catalyst can be used as an FCC catalyst of either the one-body type or the additive type, and (c) a gasoline and an LCO fraction can be obtained in high yields while maintaining reduced selectivity to hydrogen and coke and without lowering the octane number, and these performances can be maintained on a high level over long. The present invention has been thus completed.

The FCC catalyst of the present invention, which has been accomplished based on this finding, (1) comprises a compound which is either a compound of a bivalent metal or a compound of bivalent and trivalent metals showing an XRD pattern of a carbonate of the bivalent metal.

In the catalyst, the compound may (2) have been dispersed in an inorganic oxide matrix or may (3) have been dispersed in an inorganic oxide matrix together with a crystalline aluminosilicate zeolite.

The FCC method of the present invention comprises using Standard Catalyst A obtained by evenly dispersing a crystalline aluminosilicate zeolite in an inorganic oxide matrix as a mixture with at least one of Catalyst B described in (1) above, Catalyst C described in (2) above, and Catalyst D described in (3) above; Catalyst D as a mixture with at least one of Catalyst B and Catalyst C; or Catalyst D alone.

BRIEF DESCRIPTION OF THE DRAWINGS

FIG. 7 shows an XRD pattern for MC-9 (oystershell Ca—$CO_3$).
FIG. 8 shows an XRD pattern for a hydrotalcite.

BEST MODE FOR CARRYING OUT THE INVENTION

Figure 1:
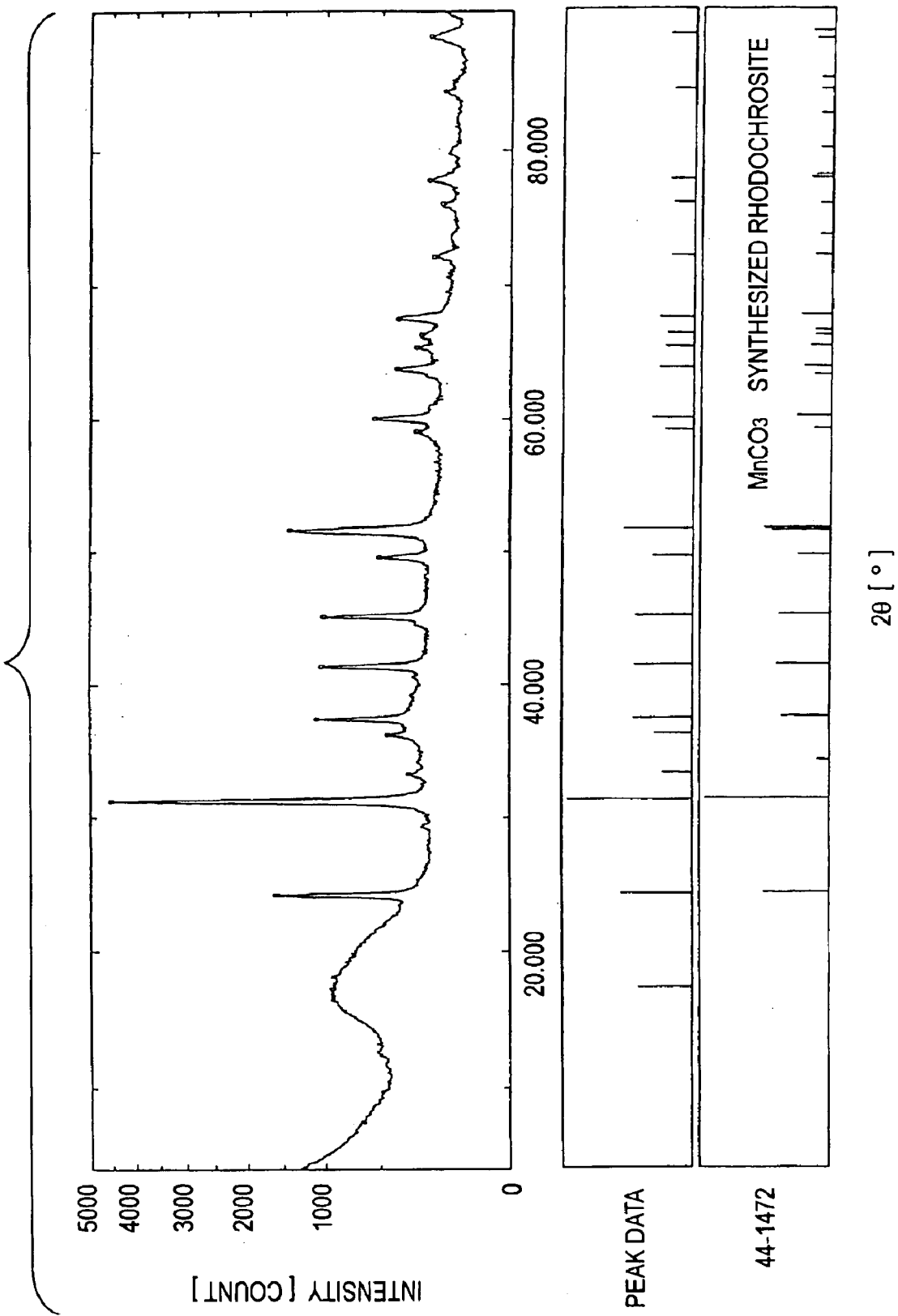
FIG. 1 shows an XRD pattern for MC-1 (Mn—Al—$CO_3$).

Catalyst B of the present invention described in (1) above has no cracking activity when used alone. It is an FCC catalyst of the so-called additive type, which is added to and used with an FCC catalyst such as Standard Catalyst A described above, which has a cracking activity.

Catalyst C described in (2) above is one in which the active ingredient of Catalyst B has been dispersed in an inorganic oxide matrix and which has enhanced mechanical strength. Catalyst C also has no cracking activity when used alone. Like Catalyst B, Catalyst C is an FCC catalyst of the so-called additive type, which is added to and used with an FCC catalyst such as Standard Catalyst A.

Catalyst D described in (3) above is one in which the active ingredient of Catalyst B has been dispersed in an inorganic oxide matrix together with a crystalline aluminosilicate zeolite, which has a cracking activity. Catalyst D has a cracking activity even when used alone, and can be used as an FCC catalyst of the so-called one-body type.

The catalyst of the present invention comprising a compound of a bivalent metal or a compound of bivalent and trivalent metals showing an XRD pattern of a carbonate of the bivalent metal (hereinafter referred to as a "compound of bivalent and trivalent metals") and having one peak attributable to anion clay or the like is Catalyst B of the present invention.

Any bivalent and trivalent metals can be used as the bivalent and trivalent metals. However, the bivalent metal is preferably at least one selected from the group consisting of $Mg^{2+}$, $Mn^{2+}$, $Ca^{2+}$, $Sr^{2+}$, $Ba^{2+}$, $Sn^{2+}$ and $Zn^{2+}$, and is more preferably at least one selected from the group consisting of $Mn^{2+}$, $Ca^{2+}$, $Sr^{2+}$, $Ba^{2+}$ and $Sn^{2+}$. The trivalent metal is preferably at least one selected from the group consisting of $Al^{3+}$, $Fe^{3+}$, $Cr^{3+}$, $Co^{3+}$, $La^{3+}$, $Mn^{3+}$, $Ti^{3+}$, $Ga^{3+}$, $Sb^{3+}$ and $Bi^{3+}$, and is more preferably at least one selected from the group consisting of $Al^{3+}$ and $Mn^{3+}$. In particular, $Al^{3+}$ is the most preferable because it gives a large surface area.

The compound of a bivalent metal and compound of bivalent and trivalent metals described above can be a compound of any desired combination of at least one of the metals enumerated above.

Namely, the compound of a bivalent metal may be a compound having one of those bivalent metals as the only bivalent metal, or may be a composite compound having two or more of those in combination. In this case, the metals may be mixed in any proportion.

As the compound of bivalent and trivalent metals, a combination of at least one member selected from $Mn^{2+}$, $Ca^{2+}$, $Sr^{2+}$, $Ba^{2+}$ and $Sn^{2+}$ with $Al^{3+}$ is especially effective in deactivating catalyst poison metals and removing $SO_x$ because the catalyst efficiently adsorbs nickel oxides, vanadium oxides and sulfur oxides. In this case, at least two bivalent metals may be mixed in any proportion and at least two trivalent metals may be mixed in any proportion. However, the proportion of the bivalent metals to the trivalent metals to be mixed therewith is such that the bivalent metal/trivalent metal molar ratio is preferably from 0.5 to 10, more preferably from 2 to 5.

When alumina is used as the inorganic oxide matrix in Catalysts C and D, the bivalent-metal compound among the metal compounds is preferably one having $Ca^{2+}$, $Sr^{2+}$ or $Ba^{2+}$ because the catalyst has the high ability to deactivate catalyst poison metals.

When the compound of a bivalent metal or the compound of bivalent and trivalent metals is used as Catalyst B, a suitable form of the compound is a particulate form having an average particle diameter equal to that of Standard Catalyst A or Catalyst C or D to be used in combination therewith, i.e., from 50 to 90 μm, a bulk density of from 0.3 to 1.2 g/mL, and an oil absorption of 0.1 cc/g or more.

On the other hand, when the compound is mixed with an inorganic oxide matrix, a crystalline aluminosilicate zeolite, etc. and used as a component of Catalyst C or D, a suitable form thereof is a particulate form having an average particle diameter of from 0.0001 to 60 μm, preferably from 0.001 to 30 μm, and more preferably from 0.1 to 10 μm. When the particle diameter thereof exceeds 60 μm, Catalyst C or D finally obtained is undesirable as an FCC catalyst from the standpoints of bulk density, catalyst strength, etc. because such a particle diameter is equal to the average particle diameter of Catalyst C or D. When the particle diameter thereof is smaller than 0.0001 μm, handling is difficult.

Examples of the compound of a bivalent metal and examples of the compound of bivalent and trivalent metals include oxides, carbonates, sulfates, halide salts, phosphates and the like. Among these, carbonates are preferable. The carbonates may be synthetic ones or natural ones, and commercial products can be used as they are.

When alumina is used as the inorganic oxide matrix in Catalysts C and D, preferable carbonates are calcium carbonate, strontium carbonate and barium carbonate, in which the bivalent metals are $Ca^{2+}$, $Sr^{2+}$ and $Ba^{2+}$, from the standpoints of not only the ability to deactivate catalyst poison metals but also catalyst abrasion strength. In particular, calcium carbonate is most preferable because it has a lower true specific gravity than strontium carbonate and barium carbonate, it prevents the finished catalyst from having an increased bulk density and makes catalyst preparation easy, and that calcium carbonate is innoxious, easy to handle, and easily available.

Synthetic carbonates can be obtained, for example, as follows.

The carbonate of a bivalent metal is obtained by adding an aqueous solution of a water-soluble salt of a bivalent metal to an aqueous solution of an alkali carbonate and regulating the pH thereof with an aqueous alkali solution to obtain a slurry of a crystalline carbonate.

When at least two bivalent metals are used in combination, aqueous solutions of water-soluble salts of the at least two bivalent metals are mixed together beforehand and the mixture is treated in the same manner as that described above to thereby obtain a slurry.

A carbonate of bivalent and trivalent metals is obtained by mixing beforehand an aqueous solution of a water-soluble salt of at least one bivalent metal with an aqueous solution of a water-soluble salt of at least one trivalent metal and treating the mixture in the same manner as that described above to thereby obtain a slurry.

The water-soluble salts described above may be either inorganic salts or organic salts. Examples of the counter ions in the salts include $F^-$, $Cl^-$, $Br^-$, $I^-$, $NO_3^-$, $CO_3^{2-}$, $SO_4^{2-}$, $PO_4^{3-}$, $ClO_4^-$, $BO_3^{2-}$, $CH_3COO^-$, oxalic acid, salicylic acid and the like. Inexpensive $Cl^-$, $NO_3^-$, $SO_4^{2-}$ and $CO_3^{2-}$ are preferable.

There are cases where acid ions come into the gel during slurry aging, depending on the kind of such counter ions, and the acid ions incorporated are difficult to remove completely. The residual acid ions may have adverse influence on the product catalyst. $NO_3^-$ salts are the most preferable because the counter ion is apt to volatilize in a burning treatment and, hence, does not cause such a trouble.

With respect to the aqueous solution of an alkali carbonate to which an aqueous solution of any of those water-soluble salts is to be added, carbonates in which the alkali ions (counter cations) are $NH_4$, Na and K are preferable because they are generally inexpensive and easily available. However, when the aged slurry is used without being subjected to a washing treatment or the like, there are cases where ions come into the gel during aging, depending on the kind of the alkali, and have adverse influence on the product catalyst, as in the case of the salts of bivalent metals and trivalent metals described above. $NH_4$ salts are preferable because the counter ion is apt to volatilize in a burning treatment and, hence, does not cause such a trouble.

The crystals in the thus-obtained slurry of a crystalline carbonate are subjected to aging. The aging is preferably carried out at a pH of from 6 to 14 and a temperature of from 0 to 100° C. The aging may be conducted for any time period.

In general, longer aging periods are advantageous in obtaining larger crystal sizes (particle diameters), and shorter aging periods may be used in obtaining smaller crystal sizes. Furthermore, the higher the aging temperature is, the higher the crystallinity is.

For obtaining crystal particles having the particle diameter shown above, it is preferable that the aging is carried out for 0.5 to 36 hours at a temperature of from 50 to 90° C. and a pH of from 8 to 11. Any crystalline carbonate thus obtained under such aging conditions is suitable for use as Catalyst B of the present invention or as a component of Catalyst C or D.

After the crystal aging, the crystalline-carbonate slurry can be subjected, without any treatment, to drying and particle diameter regulation so as to be used as Catalyst B, or can be used, without any treatment, as a component of Catalyst C or D. However, it is preferable to use the slurry after it is washed with ammonia water or an aqueous ammonium salt solution and with water to remove metallic and other impurities which may have adverse influence on the catalyst.

When the slurry is used as a component of Catalyst C or D, it may be regulated so as to have a smaller particle diameter than the FCC catalyst particles by subjecting the slurry to spray drying or to drying and subsequent milling or the like. However, from the standpoint of reducing the time period necessary for preparing Catalyst C or D, it is preferable to regulate the particle diameter beforehand to the size described above and use the slurry.

The crystalline carbonate of a bivalent metal or of bivalent and trivalent metals considerably changes in its basic nature through a heat treatment, and the basic nature has great influences on the metal-deactivating ability.

The crystalline carbonate of a bivalent metal or of bivalent and trivalent metals used in the present invention can be dried and burned at a temperature of from 20 to 900° C. However, from the standpoint of enhancing the metal-deactivating ability, the treatment is conducted preferably at a temperature of from 300 to 800° C., more preferably from 500 to 700° C.

Examples of natural carbonates include ores, shells, and bones of animals.

Examples of ores include calcite, iceland spar, aragonite, limestone, marble, whiting, strontianite, witherite, rhodochrosite and the like.

Any shells and animal bones can be used as the natural shells and animal bones. Examples include shells of abalones, corbiculas, short-necked clams, clams, oysters, scallops, turbos and the like, and bones of cattle, pigs, horses, sheep, chickens, fishes and the like. They are easily available at low cost. In addition, when shells are used, they produce an effect that the abrasion strength of the catalyst can be enhanced.

The natural carbonates may be used alone, or at least two may be suitably selected therefrom and used as a mixture of these in an appropriate proportion.

In the case of shells or bones, organic matters, water and the like are adhered thereto. It is therefore preferable to use shells or bones after they are washed, burned and then pulverized. The burning may be conducted under any conditions so long as the organic matters, water and the like can be removed. Suitable burning is conducted at a temperature of from 300 to 900° C. for about from 10 minutes to 5 hours, preferably at a temperature of from 500 to 800° C. for about from 30 to 5 hours.

The shells or bones which have been burned under such conditions can be relatively easily pulverized. They may be directly pulverized with a mill. Alternatively, they are primarily crushed with a water jet or the like and then secondarily pulverized with a wet mill, or are primarily crushed with a hammer mill or the like and the secondarily pulverized with a dry mill. Thus, the burned shells or bones are regulated so as to have the average particle diameter described above.

Catalysts B and C, which are of the additive type, desirably have the same material properties as Standard Catalyst A used in combination therewith or as Catalyst D, which is of the one-body type, used in combination therewith. When the catalysts differ from each other in strength, particle diameter or bulk density, there are cases where the catalysts do not evenly mix with each other and are unable to exhibit sufficient catalytic performance.

The material properties of Catalysts A to D cannot be unconditionally determined because they vary depending on the kind of the FCC apparatus and operating conditions therefor. However, from the standpoint of obtaining satisfactory flowability in FCC apparatus, the catalysts generally preferably have an average particle diameter of from 50 to 90 μm, a bulk density of from 0.3 to 1.2 g/mL, and an oil absorption of 0.1 cc/g or more, as described above.

Catalyst C of the present invention comprises an inorganic oxide matrix and, dispersed therein, the compound of a bivalent metal or the compound of bivalent and trivalent metals, and has no FCC activity. Namely, it is a catalyst of the additive type which is added to and used with an FCC catalyst having an FCC activity, such as Standard Catalyst A, Catalyst D, etc.

In Catalyst C, the amount of the metal compound is preferably from 1 to 90% by weight, and more preferably from 30 to 70% by weight, on a dry basis. When the amount thereof is less than 1% by weight, the metal-inactivating ability and $SO_x$-adsorbing ability are low. Even when the amount thereof is increased to be more than 90% by weight, not only substantially no enhancement in effect is obtained but also the relatively reduced amount of the inorganic oxide leads to a decrease in the particle-bonding strength attributable to the inorganic oxide.

Examples of the inorganic oxide in Catalyst C include known inorganic oxides used in ordinary cracking catalysts, such as silica, silica-alumina, alumina, silica-magnesia, alumina-magnesia, phosphorus-alumina, silica-zirconia, silica-magnesia-alumina and the like. A clay such as kaolin, halloysite, montmorillonite, or the like may be mixed with the inorganic oxides.

An especially preferable example of Catalyst C is a catalyst comprising a combination of alumina as the inorganic oxide and calcium carbonate as the bivalent-metal compound, because it has the high ability to deactivate catalyst poisons.

Catalyst C can be produced by adding the metal compound to the inorganic oxide, followed by evenly dispersion, spray-drying the resulting mixture slurry in the usual manner, washing the resulting particles if necessary, and drying them again or drying/burning them.

In this operation, the metal compounds of some kinds may be difficult, due to their basic nature, to evenly mix with the inorganic oxide or other catalyst ingredients optionally incorporated. In this case, it is preferable to reduce the basic nature of the metal compounds by coating with phosphoric acid, coating with alumina or the like.

Catalyst D of the present invention comprises the compound of a bivalent meal or compound of bivalent and trivalent metals, a crystalline aluminosilicate zeolite, and an inorganic oxide matrix in which the metal compound and zeolite are dispersed. The catalyst has the metal-deactivating effect attributable to the metal compound and further has the FCC activity of the crystalline aluminosilicate zeolite. Catalyst D is hence a catalyst of the one-body type which can be used alone as an FCC catalyst.

In Catalyst D, the amount of the metal compound is preferably from 0.01 to 20% by weight, more preferably from 0.1 to 10% by weight, and most preferably from 0.5 to 5% by weight, on a dry basis.

When the amount thereof is less than 0.01% by weight, the metal-deactivating effect and $SO_x$ trapping are insufficient. When the amount thereof is more than 20% by weight, the relative content of the crystalline aluminosilicate zeolite or of the inorganic oxide decreases and the FCC activity and selectivity to gasoline are reduced. The results not only make it difficult to catalytically crack a feedstock oil in a desired manner but also cause problems, for example, that the catalyst strength decreases.

The amount of the crystalline aluminosilicate zeolite in Catalyst D is preferably from 10 to 50% by weight, and more preferably from 20 to 40% by weight, on a dry basis.

When the amount thereof is less than 10% by weight, the FCC activity and selectivity to gasoline are reduced, making it difficult to catalytically crack a feedstock oil in a desired manner. When the amount thereof is more than 50% by weight, the relative content of the metal compound or of the inorganic oxide matrix decreases and the desired metal-deactivating effect is not obtained or the desired catalyst strength may not been obtained.

Examples of the inorganic oxide in Catalyst D include the same inorganic oxides as those used in Catalyst C. Clays such as those for use in Catalyst C may be incorporated into the inorganic oxide.

Examples of the crystalline aluminosilicate zeolite include zeolites X, zeolites Y, zeolites β, mordenite, zeolites ZSM, natural zeolites and the like. Similar to the ordinary FCC catalysts, the zeolites can be used in a form ion-exchanged with a cation selected from hydrogen, ammonium and polyvalent metals.

Zeolites Y are especially preferable, and zeolite USY, which has excellent hydrothermal stability, is most preferable.

The most preferable zeolite is a heat-shock crystalline aluminosilicate zeolite (hereinafter referred to as "HS zeolite") which is obtained by burning a stabilized zeolite Y having an $SiO_2/Al_2O_3$ molar ratio of from 5 to 15, a unit lattice size of from 24.50 Å to less than 24.70 Å, and an alkali metal content (in terms of oxide) of from 0.02% by weight to less than 1% by weight at from 600 to 1,200° C. for from 5 to 300 minutes in an air or nitrogen atmosphere so as to result in a decrease in the crystallinity of the stabilized zeolite Y of 20% or less. In the zeolite, the $SiO_2/Al_2O_3$ molar ratio in the bulk is from 5 to 15 and the molar ratio of the aluminum present in the zeolite framework to all aluminum is from 0.3 to 0.6. The zeolite has a unit lattice size less than 24.45 Å and an alkali metal content (in terms of oxide) of from 0.02% by weight to less than 1% by weight and has a pore distribution having characteristic peaks at around 50 Å and 180 Å in which the volume of the pores of at least 100 Å is from 10 to 40% of the total pore volume. The zeolite has an X-ray diffraction pattern which is a main pattern for zeolites Y (See Japanese Patent No. 2,544,317.)

Catalyst D can be produced by adding the zeolite and the metal compound to an inorganic oxide, followed by even dispersion to thereby prepare a mixture slurry, and treating the slurry in the same manner as in the production of Catalyst C described above.

In this production, the metal compound may be difficult, due to its basic nature, to evenly mix with the inorganic oxide or crystalline aluminosilicate zeolite or with other catalyst ingredients optionally incorporated. In this case, the basic nature of the metal compound can be reduced by coating with phosphoric acid, coating with alumina and the like, as in the production of Catalyst C.

Standard Catalyst A, which may be used in combination with at least one of Catalysts B to D described above, comprises a matrix comprising an inorganic oxide and a crystalline aluminosilicate zeolite evenly dispersed in the matrix. Any of various cracking catalysts ordinary used can be used.

Examples of the inorganic oxide and crystalline aluminosilicate zeolite include those which are the same as in Catalysts C and D of the present invention described above.

In FCC catalysts ordinary used, the amount of the crystalline aluminosilicate zeolite dispersed in a matrix comprising the inorganic oxide or comprising it and a clay is about from 10 to 50% by weight, and preferably about from 20 to 40% by weight. In the present invention, however, the proportion of mixed Catalyst B, C or D should be taken into account because Catalyst B, C or D is used in combination with Standard Catalyst A.

Specifically, it is suitable to regulate the amount of the crystalline aluminosilicate zeolite to at least 10% by weight, preferably from 10 to 50% by weight, and more preferably from 20 to 40% by weight, based on the total amount of Catalysts A, B, C and D.

When the amount of the zeolite is less than 10% by weight, the desired FCC activity cannot be obtained. Even when the amount thereof is increased to be 50% by weight or more, the effect of mixing the zeolite is not enhanced any more. Therefore, such large zeolite amounts are uneconomical.

For obtaining the desired zeolite proportion, it is advantageous to regulate beforehand the zeolite amount in the FCC catalyst.

Standard Catalyst A desired above can be produced by adding the crystalline aluminosilicate zeolite to the inorganic oxide, followed by even dispersion, spray-drying the resulting mixture slurry in the usual manner, washing the resulting particles if necessary, and drying these again or burning the particles after drying.

The FCC method of the present invention is conducted using at least one of the additive type catalysts B and C described above and the one-body type Catalyst D described above in combination with Standard Catalyst A, or using the one-body type Catalyst D in combination with at least one of the additive type Catalysts B and C, or using the one-body type Catalyst D alone.

When at least one of Catalysts B to D is used in combination with Standard Catalyst A, the proportions of the catalysts used are determined while taking account of the following.

When Standard Catalyst A is used in combination with Catalyst D, any proportions thereof may be selected according to the desired metal-deactivating ability and desired $SO_x$-trapping ability.

When either or both of Catalysts A and D are used in combination with either or both of Catalysts B and C, it is suitable that (either or both of Catalysts A and D)/(either or both of Catalysts B and C) is from 99.9/0.1 to 50/50, preferably from 99.5/0.5 to 80/20, and more preferably from 99/1 to 90/10, in terms of weight ratio. When either or both of the additive type Catalysts B and C account for more than a half of the total catalyst amount, the FCC activity and selectivity to gasoline are reduced, making it difficult to catalytically crack a feedstock oil in a desired manner.

In the FCC method of the present invention, Catalysts A to D may be used as independent particulate catalysts in the proportion described above or used as particles of a catalyst mixture prepared beforehand in the proportion described above. FCC can be accomplished by bringing a heavy hydrocarbon oil as a feedstock oil into contact with the catalyst particles under FCC conditions.

Examples of the heavy hydrocarbon oil is, for example, vacuum distillation gas oil, topping residue, vacuum distillation residue, a blend of these and the like.

The FCC catalyst of the present invention is effective even when a heavy hydrocarbon oil reduced in the contents of nickel or vanadium compounds and of sulfur compounds is used as a feedstock oil. However, the catalyst is extremely useful when it is used for the catalytic cracking of a low-quality heavy hydrocarbon oil containing catalyst poison metals and sulfur compounds in large amounts (e.g., having a sulfur content of 0.2% by weight or more and a metal content of 50 ppm (in terms of metal amount) or more). Consequently, the FCC method of the present invention can provide a remarkable effect when such a low-quality heavy hydrocarbon oil is used as a feedstock oil.

In practicing the FCC method of the present invention, the amount of the metal contaminants and sulfur compounds contained in the feedstock oil is taken into account. When the amount thereof is large, a mixture of Standard Catalyst A or one-body type Catalyst D with the additive type Catalyst B or C may be used so that the additive type Catalyst B or C is contained in an increased proportion. Thus, the decrease in FCC activity which may occur due to the relatively reduced amount of Standard Catalyst A or one-body Catalyst D can be compensated for by the increase in the amount of the crystalline aluminosilicate zeolite dispersed in Standard Catalyst A or one-body type Catalyst D.

The FCC conditions used in the present invention can be FCC conditions ordinary used. Typical examples of the FCC conditions are as follows:

Reaction temperature: 460–540° C.

WHSV: 4–20 $hr^{-1}$

Catalyst/oil ratio: 4–12

In FCC processes, FCC catalysts which have been deactivated by coke deposition are generally regenerated by carbon burning and reused in FCC reactions. In the FCC catalyst and FCC method of the present invention, too, Standard Catalyst A, one-body type Catalyst D, and additive type Catalysts B and C which have been spent can be regenerated with an existing regenerator under usual regeneration conditions and reused.

The regeneration is conducted at a temperature of from 600 to 750° C. Catalysts B to D of the present invention show an excellent effect in trapping the $SO_x$ which generates during this regeneration.

Catalysts B to D of the present invention deactivate catalyst poison metals contained in feedstock oils, e.g., nickel and vanadium, are reduced in the amount of hydrogen and coke yielded and excellent in cracking activity and bottom oil-treating ability, and can yield a gasoline and an LCO fraction in high yields. Furthermore, the catalysts can retain the performances on a high level over long and hence have an improved catalyst life. In addition, since the catalysts adsorb $SO_x$ in a large amount, they are effective in reducing the amount of $SO_x$ contained in the discharge gas from the FCC apparatus.

EXAMPLES

Catalyst Preparation:
1. Preparation of Crystalline Metal Compounds Comprising Bivalent Metal or Comprising Bivalent and Trivalent Metals

Example 1

In a 3-liter (hereinafter, liter is referred to as "L" and milliliter is referred to as "mL") glass beaker containing 1,000 mL of distillation-purified water, 271.9 g of manganese sulfate pentahydrate was dissolved, followed by stirring with a magnetic stirrer for 15 minutes to prepare Solution A. Solution A had a pH of 4.54.

In a 3-L glass beaker containing 1,000 mL of distillation-purified water, 125 g of aluminum sulfate octadecahydrate was dissolved, followed by stirring with a magnetic stirrer for 15 minutes to prepare Solution B. Solution B had a pH of 1.63.

Solution A was mixed with Solution B in a 5-L glass beaker, heated to 80° C. and stirred with a magnetic stirrer to prepare Solution C.

In a 5-L glass beaker containing 1,000 mL of distillation-purified water, 113.8 g of sodium carbonate was dissolved, followed by heating to 80° C. and stirring with an ultradisperser for 15 minutes to prepare Solution D. Solution D had a pH of 11.47.

While stirring Solution D with an ultradisperser, Solution C was gradually added thereto with a feed pump. During the operation, ammonia water was also added to keep the pH of the solution mixture at 9.

The solution mixture was subjected to aging with stirring at 80° C. for 3 hours to yield a metal compound.

After termination of the aging, the solution was filtered through a Buchner funnel. To the slurry (metal compound) separated, 2 L of distillation-purified water heated to 80° C. was added. The resulting mixture was stirred and filtered. The operation was repeated to conduct washing twice.

The slurry separated by filtration was dried at 100° C. for about 24 hours to obtain a metal compound.

The metal compound which had been dried was pulverized with a mill to a particle diameter of 15 μm or less.

The metal compound is referred to as MC-1 (Mn—Al—$CO_3$).

APS (average particle diameter) and SA (specific surface area) of MC-1 were examined and the metal composition was ascertained with an ICP apparatus. The results are shown in Table 1. Before being examined by ICP, samples were subjected to a burning treatment at 1,100° C. for 2 hours as a pretreatment.

Furthermore, an XRD apparatus was used to analyze the crystal structure. The results are shown in FIG. 1.

In FIG. 1, the results of the analysis with the XRD apparatus are shown in the upper section, peak data are shown in the middle section, and the Mn—Al—$CO_3$ data from JCPDS-PDF (Joint Committee on Power Diffraction Standards-Power Diffraction; data bank dealing with a collection of X-ray powder diffraction data) are shown in the lower section.

FIG. 1 clearly shows that MC-1 has the crystal structure of a bivalent-metal carbonate.

Example 2

Crystalline metal compounds were prepared in the same manner as in Example 1, except that the bivalent metal was replaced with $Ca^{2+}$, $Sr^{2+}$, $Ba^{2+}$ or $Sn^{2+}$ by using the chloride or nitrate of the metal in Solution A in Example 1 in an amount equimolar to the manganese sulfate.

The crystalline metal compounds prepared using $Ca^{2+}$, $Sr^{2+}$, $Ba^{2+}$ and $Sn^{2+}$ as bivalent metals are referred to as MC-2 (Ca—Al—$CO_3$), MC-3 (Sr—Al—$CO_3$), MC-4 (Ba—Al—$CO_3$) and MC-5 (Sn—Al—$CO_3$), respectively.

APS and SA of MC-2, MC-3, MC-4 and MC-5 were examined, and the metal compositions were ascertained with an ICP apparatus. The results are shown in Table 1.

Figure 2:
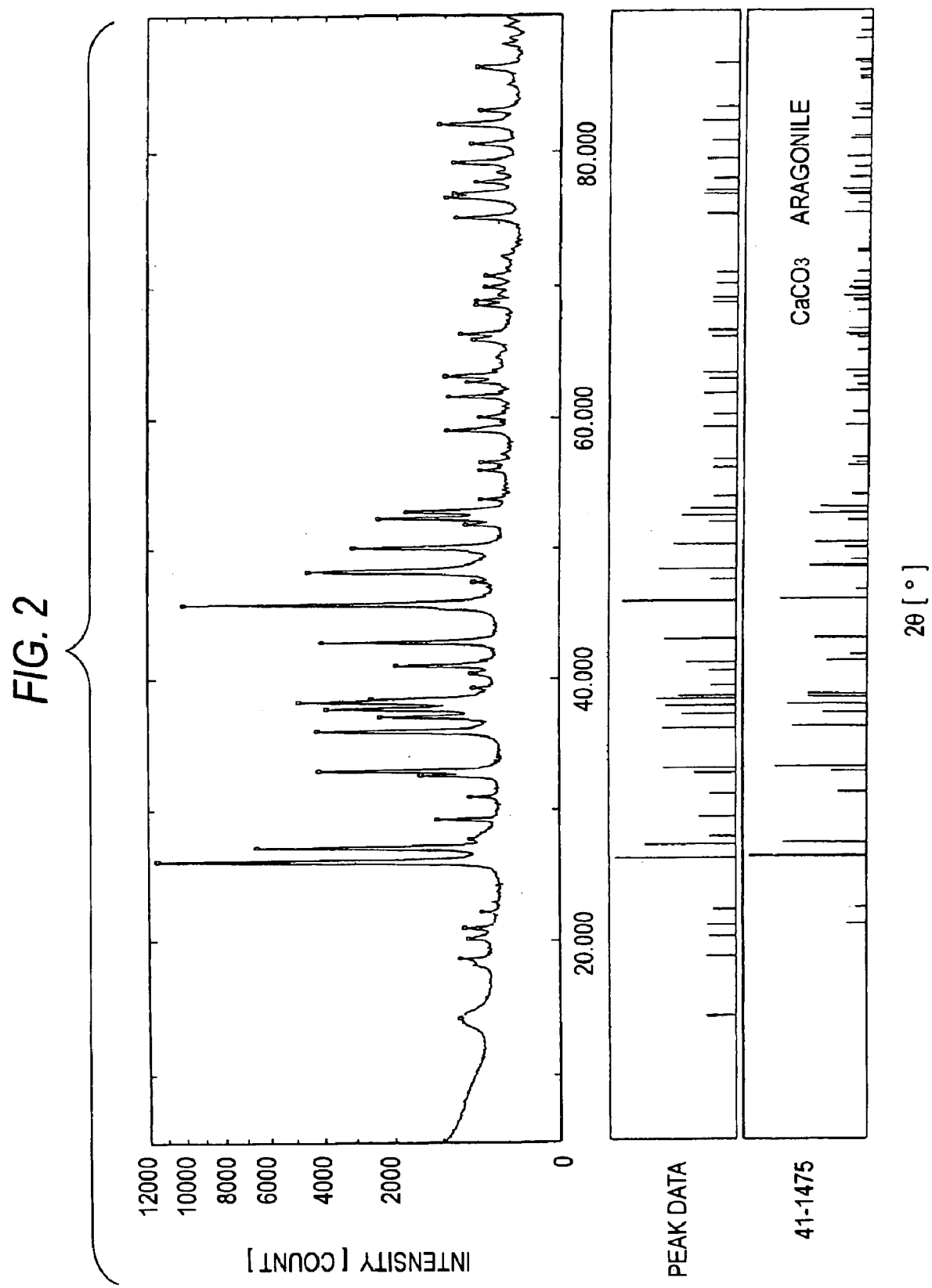
FIG. 2 shows an XRD pattern for MC-2 (Ca—Al—$CO_3$).
Figure 3:
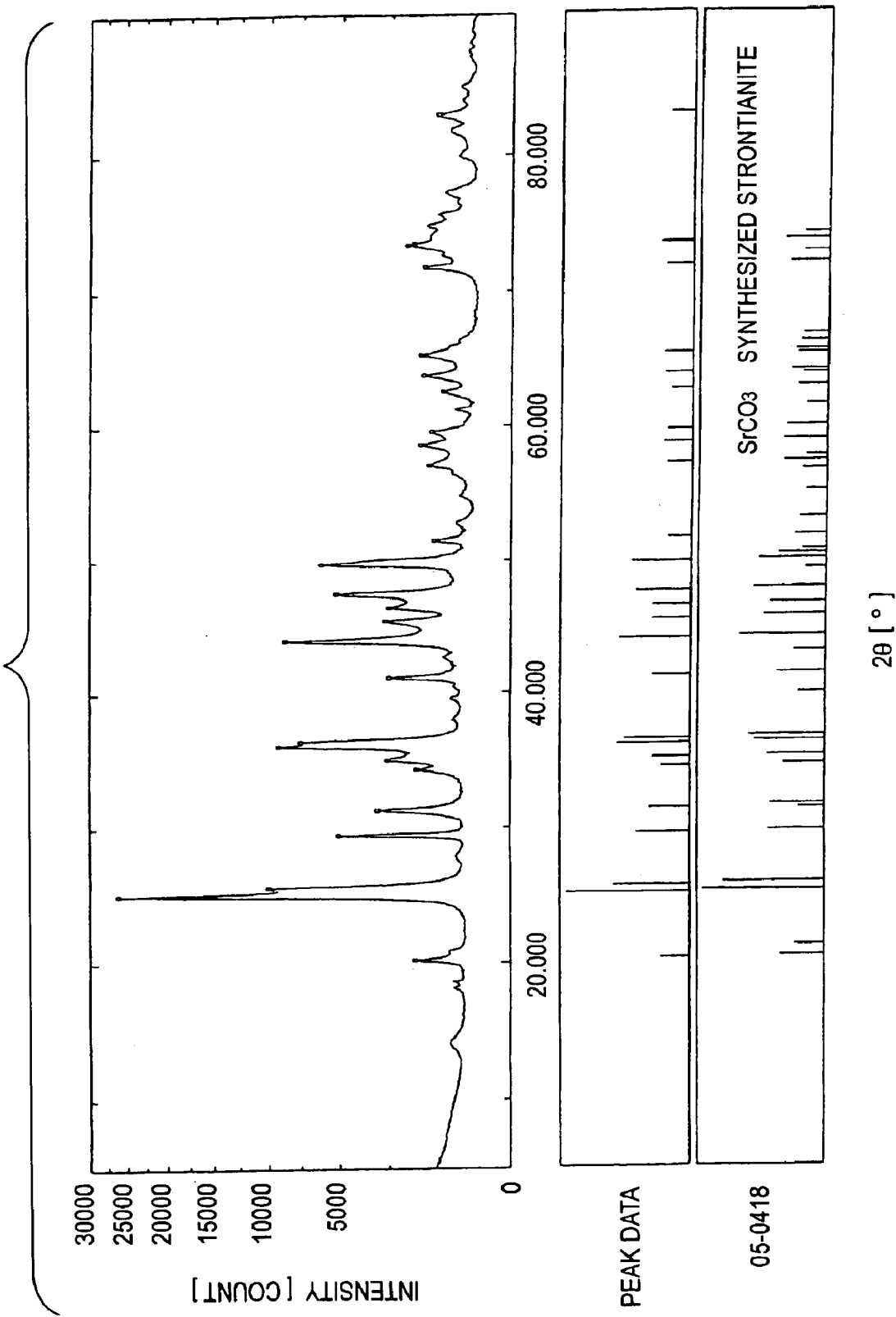
FIG. 3 shows an XRD pattern for MC-3 (Sr—Al—$CO_3$).
Figure 4:
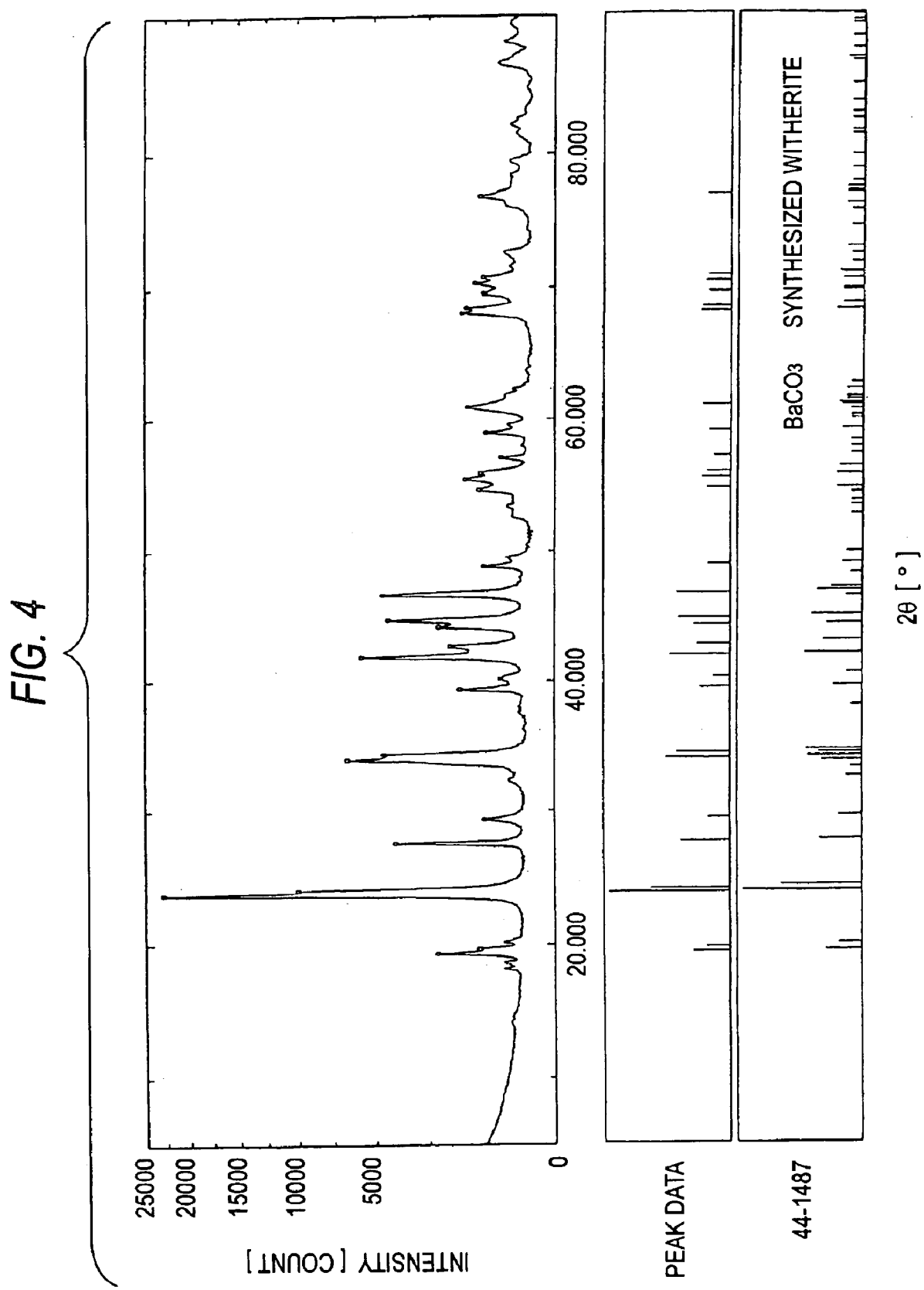
FIG. 4 shows an XRD pattern for MC-4 (Ba—Al—$CO_3$).

Furthermore, an XRD apparatus was used to analyze the crystal structures of MC-2 to MC-4. The results are shown in FIGS. 2 to 4. In FIGS. 2 to 4, the data in the upper, middle, and lower sections have the same meanings as in FIG. 1. FIGS. 2 to 4 clearly show that each of MC-2 to MC-4 has the crystal structure of a bivalent-metal carbonate.

Example 3

A crystalline metal compound was prepared in the same manner as in Example 1, except that the trivalent metal was replaced with an other metal by using the sulfate or nitrate of the trivalent metal in Solution B in Example 1 in an amount equimolar to the aluminum sulfate.

The crystalline metal compound prepared using $Mn^{3+}$ as a trivalent metal is referred to as MC-6 (Mn—Mn—$CO_3$).

APS and SA of MC-6 was examined, and the metal composition was ascertained with an ICP apparatus. The results are shown in Table 1.

Example 4

The first-grade reagent of calcium carbonate manufactured by Kanto Chemical Co., Inc. is referred to as MC-7 ($CaCO_3$); and powders prepared from scallop shells and oystershells by burning at 700° C. for 2 hours and subsequent pulverization are referred to as MC-8 ($CaCO_3$) and MC-9 ($CaCO_3$), respectively.

APS and SA of MC-7, MC-8 and MC-9 were examined, and the metal compositions were ascertained with an ICP apparatus. The results are shown in Table 1.

Figure 5:
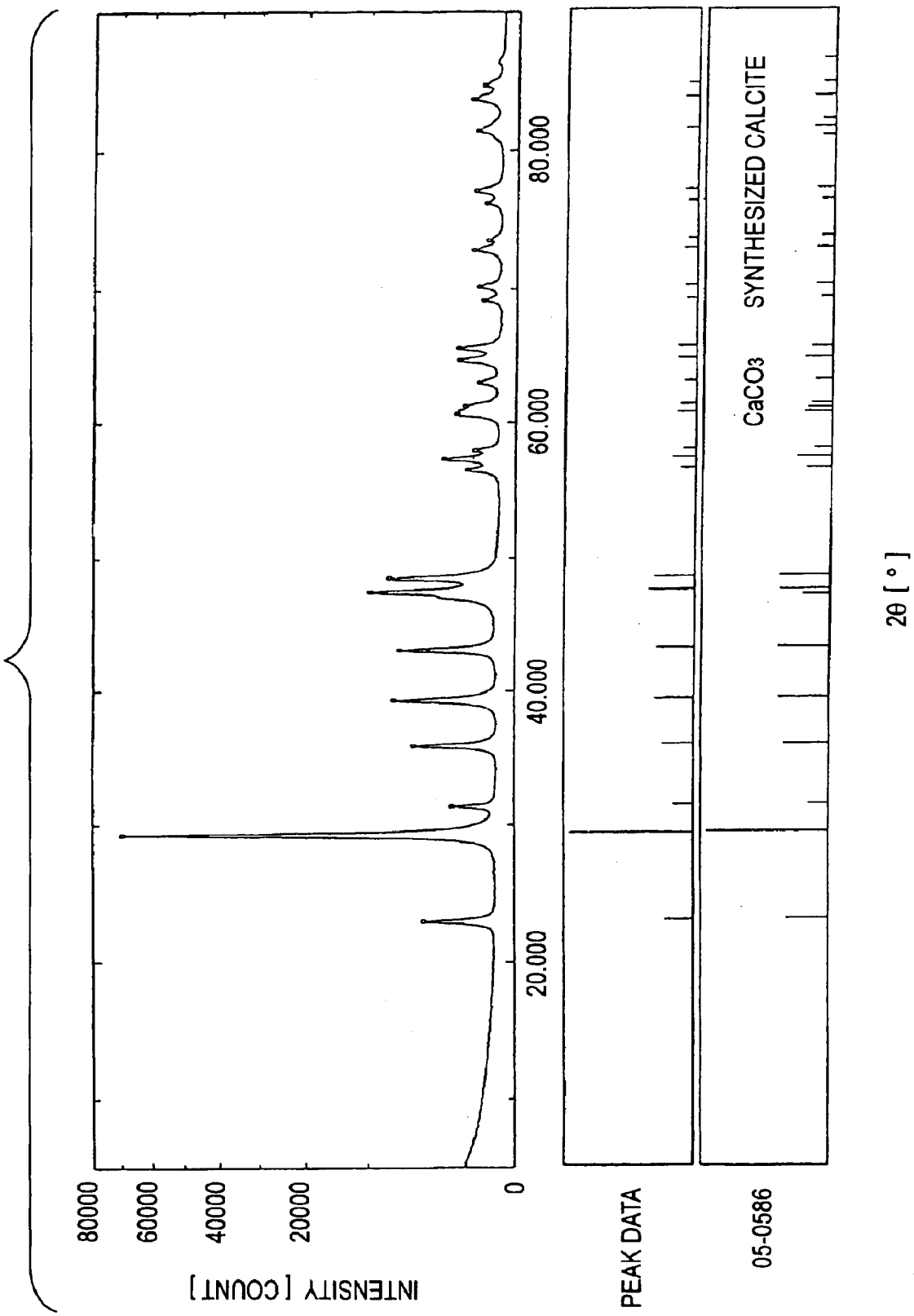
FIG. 5 shows an XRD pattern for MC-7 (Ca—$CO_3$).
Figure 6:
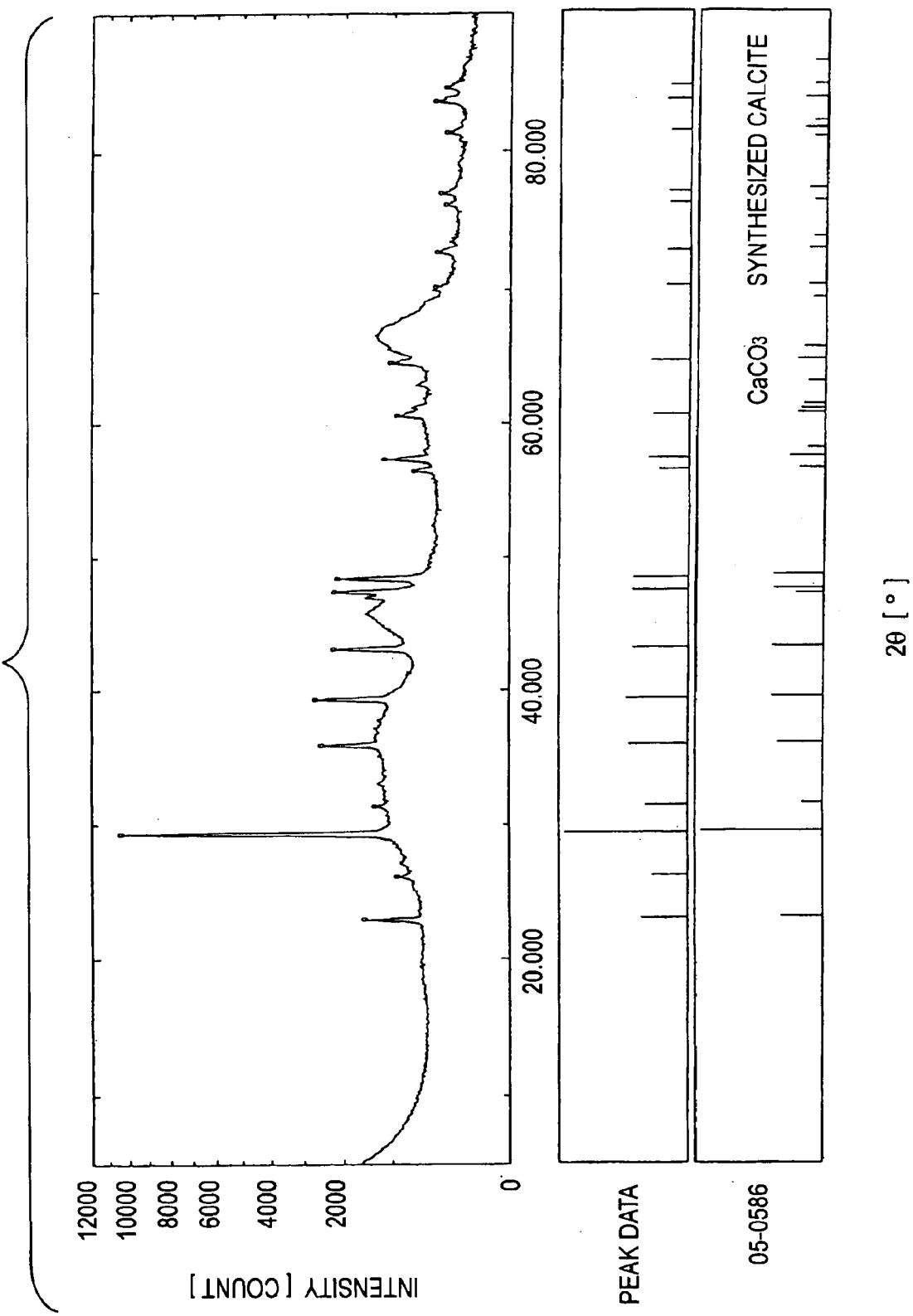
FIG. 6 shows an XRD pattern for MC-8 (scallop shell Ca—$CO_3$).

Furthermore, an XRD apparatus was used to analyze the crystal structures of MC-7 to MC-9. The results are shown in FIGS. 5 to 7. In FIGS. 5 to 7, the data in the upper, middle, and lower sections have the same meanings as in FIG. 1. FIGS. 5 to 7 clearly show that each of MC-7 to MC-9 has the crystal structure of a bivalent-metal carbonate.

TABLE 1

| | Hydrotalcite | MC-1 | MC-2 | MC-3 | MC-4 | MC-5 | MC-6 | MC-7 | MC-8 | MC-9 |
|---|---|---|---|---|---|---|---|---|---|---|
| | dry basis (wt %) | | | | | | | | | |
| $Al_2O_3$ | 34.7 | 18.58 | 34.63 | 24.53 | 15.61 | 10.03 | — | — | 0.4 | 0.3 |
| MgO | 60 | — | — | — | — | — | — | — | 0.11 | 0.1 |
| $Mn_2O_3$ | — | 77.32 | — | — | — | — | 98.45 | — | 0.04 | 0.06 |
| CaO | — | — | 63.81 | — | — | — | — | 99.5 | 96.11 | 92.45 |
| $Sr_2O_3$ | — | — | — | 73.91 | — | — | — | — | 0.1 | — |
| BaO | — | — | — | — | 84.03 | — | — | — | — | — |
| $SnO_2$ | — | — | — | — | — | 89.89 | — | — | — | — |
| $Na_2O$ | — | — | 1.56 | 1.56 | 0.36 | 0.08 | — | — | 0.3 | 0.35 |
| $K_2O$ | — | — | — | — | — | — | — | — | 0.06 | 0.07 |
| APS (μm) | 0.5 | 2 | 3.6 | 1.3 | 1.1 | 1.6 | 1.5 | 1.7 | 2.7 | 3.5 |
| SA (m²/g) | 150 | 104 | 27 | 24 | 32 | 53 | 12 | 2 | 5.9 | 6.9 |

2. Preparation of Catalysts

Example 5

To 400 g of a silica hydrosol containing 10% by weight $SiO_2$, 64 g of HS zeolite and 86 g of kaolin clay on a dry basis were added to thereby obtain a mixture slurry.

The mixture slurry was spray-dried so as to result in particles having an average particle diameter of 68±5 μm. The particles were washed and then dried again to obtain Standard Catalyst A.

Standard Catalyst A is referred to as Base 1. It was used as a reference mainly for comparison with one-body type Catalyst D.

On the other hand, Standard Catalyst A was produced on a commercial scale in an amount of about 100 tons through one operation. The catalyst is referred to as Base 2. It was used as a reference mainly for the evaluation of additive-type Catalysts B and C.

APS, SA, ABD (apparent bulk density) and PV (pore volume) of Standard Catalysts A (Bases 1 and 2) were examined. The results are shown in Tables 2 and 3.

Example 6

To 400 g of a silica hydrosol containing 10% by weight $SiO_2$, 64 g of HS zeolite and 86 g of kaolin clay on a dry basis were added, and 10 g of a metal compound having a particle diameter of 15 μm or less prepared in Examples 1 and 2 was prepared to thereby obtain a mixture slurry.

The mixture slurry was spray-dried so as to result in particles having an average particle diameter of 68±5 μm. The particles were washed and then dried again to obtain one-body type Catalyst D having the metal compound fixed thereto.

One-body type catalysts using MC-1, MC-2, MC-5, MC-7 and hydrotalcite KW-2200 manufactured by Kyowa Chemical Co., Ltd. as the metal compound are referred to as Catalysts D1, D2, D3, D4 and X, respectively.

APS, SA, ABD and PVC of Catalysts D1, D2, D3 and D4 were examined. The results are all shown in Table 2.

Furthermore, the metal compositions were ascertained with an ICP apparatus. As a result, the catalysts were ascertained to contain the metal compounds in an amount of about 5% by weight on a dry basis.

The hydrotalcite KW-2200, manufactured by Kyowa Chemical Co., Ltd., was dried at 100° C. Thereafter, the hydrotalcite was examined by XRD and the hydrotalcite structure was ascertained. The results are shown in FIG. 8.

TABLE 2

| | Catalyst name | | |
|---|---|---|---|
| | Base 1 | X | D1 |
| Catalyst composition: | | | |
| Metal deactivator | — | hydrotalcite | MC-1 |
| Binder | silica | silica | silica |
| Zeolite | HS zeolite | HS zeolite | HS zeolite |
| Matrix | kaolin | kaolin | kaolin |
| Catalyst property: | | | |
| APS (μm) | 68 | 71 | 70 |
| SA (m²/g) | 223.9 | 185.5 | 212.2 |
| ABD (g/mL) | 0.78 | 0.71 | 0.71 |
| PV (mL/g) | 0.16 | 0.14 | 0.16 |

| | Catalyst name | | |
|---|---|---|---|
| | D2 | D3 | D4 |
| Catalyst composition: | | | |
| Metal deactivator | MC-2 | MC-5 | MC-7 |
| Binder | silica | silica | silica |
| Zeolite | HS zeolite | HS zeolite | HS zeolite |
| Matrix | kaolin | kaolin | kaolin |
| Catalyst property: | | | |
| APS (μm) | 70 | 70 | 68 |
| SA (m²/g) | 178.4 | 193 | 133 |
| ABD (g/mL) | 0.73 | 0.75 | 0.69 |
| PV (mL/g) | 0.16 | 0.15 | 0.16 |

Example 7

To 600 g of a silica hydrosol containing 10% by weight $SiO_2$, 40 g on a dry basis of a metal compound having a particle diameter of 15 μm or less prepared in Examples 1 to 4 was added to thereby obtain a mixture slurry.

The mixture slurry was spray-dried so as to result in particles having an average particle diameter of 68±5 μm. The particles were washed and then dried to obtain additive type Catalyst C having the metal compound fixed thereto.

Additive type Catalysts C using MC-1 and hydrotalcite KW-2200 manufactured by Kyowa Chemical Co., Ltd. as the metal compound are referred to as Catalysts C1 and Y, respectively.

APS, SA, ABD and PV of Catalysts C1 and Y were examined. The results are shown in Table 3.

Furthermore, the metal compositions were ascertained with an ICP apparatus. As a result, the catalysts were ascertained to contain the metal compounds in an amount of about 40% by weight on a dry basis.

TABLE 3

| | Catalyst name | | |
|---|---|---|---|
| | Base 2 | Y | C1 |
| Additive composition: | | | |
| Metal deactivator | — | hydrotalcite | MC-1 |
| Binder | — | silica | silica |
| Zeolite | — | — | — |
| Matrix | — | — | — |
| Catalyst property: | | | |
| APS (μm) | 65 | 67 | 67 |
| SA (m²/g) | 189.2 | 83.2 | 97.6 |
| ABD (g/mL) | 0.72 | 0.64 | 0.67 |
| PV (mL/g) | 0.15 | 0.22 | 0.245 |
| Additive proportion: | | | |
| Base 2 (wt %) | 100 | 90 | 90 |
| Additive type (wt %) | 0 | 10 | 10 |

Example 8

To 3 kg of an alumina hydrogel slurry containing 10% by weight $Al_2O_3$, 200 g on a dry basis of a metal compound having a particle diameter of 15 μm or less prepared in Examples 1 to 4 was added. The slurry was spray-dried so as to result in particles having an average particle diameter of 68±5 μm. Thus, an additive type Catalyst C having the metal compound fixed thereto was obtained.

Additive type catalysts were obtained using MC-1, MC-2, MC-3, MC-4, MC-5, MC-6, MC-7, MC-8 and MC-9 as the metal compound are referred to as Catalysts C2, C3, C4, C5, C6, C7, C8, C9 and C10, respectively.

APS, SA, ABD and PV of Catalysts C2, C3, C4, C5, C6, C7, C8, C9 and C10 were examined. Catalysts C3, C8, C9 and C10 were further examined for catalyst abrasion strength [initial fine (referred to as "IF") and average attrition loss (referred to as "AL")]. The results are shown in Table 4.

Furthermore, the metal compositions were ascertained with an ICP apparatus. As a result, the catalysts were ascertained to contain the metal compounds in an amount of about 40% by weight on a dry basis.

Moreover, 3 kg of an alumina hydrogel slurry containing 10% by weight $Al_2O_3$ was spray-dried so as to result in particles having an average particle diameter of 68±5 μm. The catalyst thus obtained is referred to as Catalyst Z.

APS, SA, ABD and PV of Catalyst Z was examined. The results are shown in Table 4.

TABLE 4

| | Catalyst name | | | |
|---|---|---|---|---|
| | Base 2 | Z | C2 | C3 |
| Additive composition: | | | | |
| Metal deactivator | — | — | MC-1 | MC-2 |
| Kind of binder | — | alumina | alumina | alumina |
| Zeolite | — | — | — | — |
| Matrix | — | — | — | — |
| Catalyst property: | | | | |
| APS (μm) | 65 | 69 | 68 | 64 |
| SA (m²/g) | 189.2 | 259 | 205 | 184 |
| ABD (g/mL) | 0.72 | 0.54 | 0.5 | 0.67 |
| PV (mL/g) | 0.15 | 0.652 | 0.715 | 0.322 |
| IF | — | — | — | 17.87 |
| AL | — | — | — | 20.61 |
| Additive proportion: | | | | |
| Base 2 (wt %) | 100 | 90 | 90 | 90 |
| Additive type (wt %) | 0 | 10 | 10 | 10 |

| | Catalyst name | | | |
|---|---|---|---|---|
| | C4 | C5 | C6 | C7 |
| Additive composition: | | | | |
| Metal deactivator | MC-3 | MC-4 | MC-5 | MC-6 |
| Kind of binder | alumina | alumina | alumina | alumina |
| Zeolite | — | — | — | — |
| Matrix | — | — | — | — |
| Catalyst property: | | | | |
| APS (μm) | 65 | 68 | 65 | 67 |
| SA (m²/g) | 201 | 174 | 186 | 145 |
| ABD (g/mL) | 0.67 | 0.78 | 0.84 | 0.7 |
| PV (mL/g) | 0.271 | 0.294 | 0.28 | 0.23 |
| IF | — | — | — | — |
| AL | — | — | — | — |
| Additive proportion: | | | | |
| Base 2 (wt %) | 90 | 90 | 90 | 90 |
| Additive type (wt %) | 10 | 10 | 10 | 10 |

| | Catalyst name | | |
|---|---|---|---|
| | C8 | C9 | C10 |
| Additive composition: | | | |
| Metal deactivator | MC-7 | MC-8 | MC-9 |
| Kind of binder | alumina | alumina | alumina |
| Zeolite | — | — | — |
| Matrix | — | — | — |
| Catalyst property: | | | |
| APS (μm) | 73 | 69 | 68 |
| SA (m²/g) | 133 | 176.7 | 192.5 |
| ABD (g/mL) | 0.78 | 0.81 | 0.83 |
| PV (mL/g) | 0.201 | 0.207 | 0.195 |
| IF | 12.6 | 6.63 | 7.01 |
| AL | 17.65 | 3.14 | 2.87 |
| Additive proportion: | | | |
| Base 2 (wt %) | 90 | 90 | 90 |
| Additive type (wt %) | 10 | 10 | 10 |

3. Analytical Instruments, Analytical Conditions, etc.

The instruments and expressions for calculation or the like used in the analyses described above are as follows.

ICP (Compositional Analysis):
"IRIS Advantage" manufactured by Thermo Jarrell Ash APS (Average Particle Diameter):
"Electromagnetic Vibrating Microsifter Type M-2" manufactured by Tsutsui Rikagaku Kiki K.K.

SA (Specific Surface Area):
"BELSORP 28" (high-precision, fully automatic gas adsorber) manufactured by Bel Japan Inc.

ABD (Apparent Bulk Density):
"Bulk Density Meter" manufactured by Tokyo Kuramochi Kagaku Kikai Seisakusho (JIS Z 2504)

PV (Pore Volume):
"MICROMERITICS AUTOPORE II 9220" manufactured by Shimadzu Corp.

IF (Initial Fine)*:
[(Fine particles in 0–12 hours (dry g))/(sample amount)] × 100

AL (Average Attrition Loss)*:

[(Fine particles in 12–42 hours (dry g))/(sample amount)]×100

* The initial fine and average attrition loss were determined through a catalyst abrasion strength test conducted as follows and through calculation.

Fifty grams of a catalyst (sample) was treated by heating at 500° C. for 5 hours, 5 g of water was added thereto, and the catalyst was flowed through a catalyst pipe at a flow rate of 0.102 m/sec. The amount of fine particles (dry g) present in the catalyst pipe was measured at the time when 12 hours had passed since initiation of the flowing (0–12 hours) and at the time when 42 hours had passed thereafter (12–42 hours). The initial fine and average attrition loss were calculated using the expressions given above.

XRD* apparatus:

"RINT 2500V" manufactured by Rigaku Corp.

* XRD analysis was conducted under the following conditions using a sample prepared by drying each catalyst at 100° C. for 24 hours:

Tube voltage: 50 kV

Tube current: 300 mA

Scanning mode: continuous

Scanning speed: 2°/min

Scanning step: 0.02°

Range of scanning (2θ): 5–90°

Divergence/scattering slit: 1°

Light-receiving slit: 0.3 mm

4. MAT Activity Test

Evaluation Conditions:

The catalysts obtained in Examples 5 to 8 were subjected to the following simulated equilibration treatment. Thereafter, the catalysts were evaluated for FCC activity and metal-deactivating ability using a fixed-bed micro activity test apparatus in accordance with ASTM (3907) and using hydrocarbon oils having the properties shown in Table 5 under the following test conditions.

Conditions for Simulated Equilibration Treatment:

Each fresh catalyst was heated from room temperature to 500° C. over 30 minutes and held at 500° C. for 5 hours to burn it.

Thereafter, a cyclohexane solution containing nickel naphthenate and vanadium naphthenate in given amounts (1,000 and 2,000 ppm by weight) was infiltrated into each catalyst.

The catalyst was dried at 100° C., subsequently heated from room temperature to 500° C. over 30 minutes, and then held at 500° C. for 5 hours to burn it again.

Subsequently, each catalyst in a fluidized state was heated from room temperature to 800° C. over 90 minutes in an air atmosphere. After the temperature had reached 800° C., the atmosphere was replaced with a 100% steam atmosphere to treat the catalyst therewith for 6 hours.

After this steam treatment, each catalyst was evaluated for FCC activity.

In evaluating the metal-deactivating ability of each catalyst, the provided amounts of nickel and vanadium on the catalyst were regulated to 0 and 0 ppm by weight, 1,000 and 2,000 ppm by weight, 2,000 and 4,000 ppm by weight, or 3,000 and 6,000 ppm by weight.

TABLE 5

Hydrocarbon oils tested: vacuum distillation gas oils

| | Sample | |
|---|---|---|
| | 1 | 2 |
| Density 15° C. g/cm$^3$ | 0.8959 | 0.8819 |
| Vacuum distillation | | |
| IBP | 319 | 294 |
| 5% ° C. | 362 | 352 |
| 10% ° C. | 383 | 367 |
| 20% ° C. | 406 | 390 |
| 30% ° C. | 421 | 402 |
| 40% ° C. | 433 | 415 |
| 50% ° C. | 446 | 424 |
| 60% ° C. | 460 | 436 |
| 70% ° C. | 481 | 451 |
| 80% ° C. | 509 | 471 |
| 90% ° C. | 566 | 506 |
| 95% ° C. | | 531 |
| 97% ° C. | | 544 |
| End point ° C. | 605 | 548 |
| Total distillate amount % | 93.5 | 98.5 |
| Residue amount % | 6.5 | 1.5 |
| Loss % | 0 | 0 |
| Pour point ° C. | 33 | 35 |
| Dynamic viscosity 50° C. mm$^2$/S | 34.54 | 18.67 |
| Nitrogen content (chemiluminescence method) wt % | 0.05 | 0.02 |
| Sulfur content (X-ray method) wt % | 0.15 | 0.01 |
| Refractive index 70 nD | 1.48 | 1.47 |
| Density 70° C. g/cm$^3$ | 0.86 | 0.84 |
| Molecular weight (calculated from viscosity) | 475 | 402 |
| Asphaltene (UOP) wt % | 0.38 | |
| n-d-m (70° C.) % CA | 15.2 | 12.8 |
| % CN | 14.6 | 18.8 |
| % CP | 70.2 | 68.4 |
| Aniline point (U-tube method) ° C. | 95.4 | 94.5 |
| Dynamic viscosity 75° C. mm$^2$/S | 14.56 | 8.77 |
| Dynamic viscosity 100° C. mm$^2$/S | 7.67 | 4.99 |
| Basic nitrogen wt % | | 0.0014 |
| Bromine number gBr$_2$/100 g | | 1.90 |
| Hydrogen content wt % | | 13.03 |
| Carbon residue content wt % | 1.25 | 0.06 |

Test Conditions: Fixed Bed

Reaction temperature: 500° C.

Catalyst/hydrocarbon oil weight ratio: 2.5, 3.0, 3.5

Test period: 75 seconds

5. Evaluation of Catalyst Performance

Example 9

One-body type Catalysts D1, D2, D3 and D4 containing MC-1, MC-2, MC-5 and MC-7, respectively, were subjected to the simulated equilibration treatment and then to the MAT activity test using Sample 2. The results are shown in Table 21.

Example 10

Catalyst X was subjected to the simulated equilibration treatment and then to the MAT activity test using Sample 2.

The results are also shown in Table 21.

TABLE 21

| | Catalyst name | | |
| --- | --- | --- | --- |
| | Base 1 | X | D1 |
| | | Metal deactivator name | |
| | — | Hydrotalcite | MC-1 |
| Conversion (wt %): | | | |
| Catalyst/oil | 3 | 3 | 3 |
| Metal provided amount: | | | |
| Ni/V (ppm) | | | |
| 0/0 | 73.13 | 58.56 | 73.49 |
| 1000/2000 | 67.70 | 56.34 | 68.83 |
| 2000/4000 | 55.50 | 49.53 | 60.25 |
| 3000/6000 | 30.64 | 36.16 | 54.43 |
| Selectivity (wt %): | | | |
| Metal provided amount: Ni/V = 2000/4000 (ppm) | | | |
| Conversion (wt %) | 60.00 | 60.00 | 60.00 |
| Yield of each ingredient (wt %) | | | |
| $H_2$ | 0.20 | 0.36 | 0.16 |
| C1-2 | 1.43 | 2.02 | 1.31 |
| LPG | 11.93 | 12.49 | 12.05 |
| GASO | 43.39 | 40.39 | 43.79 |
| LCO | 24.38 | 20.51 | 25.71 |
| HCO+ | 15.62 | 19.49 | 14.29 |
| COKE | 3.05 | 4.74 | 2.69 |
| RON | 88.49 | 88.41 | 88.40 |

| | Catalyst name | | |
| --- | --- | --- | --- |
| | D2 | D3 | D4 |
| | | Metal deactivator name | |
| | MC-2 | MC-5 | MC-7 |
| Conversion (wt %): | | | |
| Catalyst/oil | 3 | 3 | 3 |
| Metal provided amount: | | | |
| Ni/V (ppm) | | | |
| 0/0 | 72.62 | 72.71 | 72.19 |
| 1000/2000 | 67.97 | 68.70 | 67.72 |
| 2000/4000 | 57.48 | 58.90 | 55.95 |
| 3000/6000 | 46.43 | 51.28 | 41.68 |
| Selectivity (wt %): | | | |
| Metal provided amount: Ni/V = 2000/4000 (ppm) | | | |
| Conversion (wt %) | 60.00 | 60.00 | 60.00 |
| Yield of each ingredient (wt %) | | | |
| $H_2$ | 0.19 | 0.17 | 0.21 |
| C1-2 | 1.41 | 1.31 | 1.56 |
| LPG | 11.92 | 12.36 | 12.99 |
| GASO | 43.59 | 43.18 | 42.03 |
| LCO | 24.60 | 25.23 | 22.98 |
| HCO+ | 15.40 | 14.77 | 17.02 |
| COKE | 2.89 | 2.98 | 3.21 |
| RON | 88.53 | 88.38 | 88.46 |

Example 11

Additive type Catalyst C1 containing MC-1 was physically mixed in an amount of 10% by weight with Catalyst Base 2. The resulting catalyst was subjected to the simulated equilibration treatment and then to the MAT activity test using Sample 2. The results are shown in Table 31.

Example 12

Additive type Catalyst Y containing hydrotalcite KW-2200 physically mixed in an amount of 10% by weight with Catalyst Base 2. The resulting catalyst was subjected to the simulated equilibration treatment and then to the MAT activity test using Sample 2. The results are also shown in Table 31.

TABLE 31

| | Catalyst name | | |
| --- | --- | --- | --- |
| | Base 2 | Y | C1 |
| | | Metal deactivator name | |
| | — | Hydrotalcite | MC-1 |
| Conversion (wt %): | | | |
| Catalyst/oil | 3 | 3 | 3 |
| Metal provided amount: | | | |
| Ni/V (ppm) | | | |
| 0/0 | 70.93 | 66.71 | 70.19 |
| 1000/2000 | 63.21 | 56.29 | 64.89 |
| 2000/4000 | 51.65 | 48.18 | 58.70 |
| 3000/6000 | 27.36 | 35.52 | 51.98 |
| Selectivity (wt %): | | | |
| Metal provided amount: Ni/V = 2000/4000 (ppm) | | | |
| Conversion (wt %) | 60.00 | 60.00 | 60.00 |
| Yield of each ingredient (wt %) | | | |
| $H_2$ | 0.20 | 0.29 | 0.15 |
| C1–2 | 1.28 | 1.30 | 1.23 |
| LPG | 12.06 | 12.08 | 12.56 |
| GASO | 43.47 | 43.36 | 43.59 |
| LCO | 24.76 | 24.67 | 26.57 |
| HCO+ | 15.24 | 15.33 | 13.43 |
| COKE | 2.99 | 2.97 | 2.47 |
| RON | 88.43 | 88.35 | 88.65 |

Example 13

Additive type Catalysts C2, C3, C4, C5, C6, C7, C8, C9 and C10 containing MC-1, MC-2, MC-3, MC-4, MC-5, MC-6, MC-7, MC-8 and MC-9, respectively, were physically mixed in an amount of 10% by weight with Catalyst Base 2. The resulting catalysts were subjected to the simulated equilibration treatment and then to the MAT activity test using Sample 1. The results are shown in Table 41.

Example 14

Additive type Catalyst Z was physically mixed in an amount of 10% by weight with Catalyst Base 2. The resulting catalyst was subjected to the simulated equilibration treatment and then to the MAT activity test using Sample 1. The results are also shown in Table 41.

TABLE 41

| | Catalyst name | | | |
| --- | --- | --- | --- | --- |
| | Base 2 | Z | C2 | C3 |
| | | Metal deactivator name | | |
| | — | — | MC-1 | MC-2 |
| Conversion (wt %): | | | | |
| Catalyst/oil | 3 | 3 | 3 | 3 |
| Metal provided amount: | | | | |
| Ni/V (ppm) | | | | |
| 0/0 | 67.71 | 67.29 | 68.07 | 67.21 |
| 1000/2000 | 59.96 | 62.48 | 66.62 | 65.68 |
| 2000/4000 | 48.77 | 53.43 | 62.38 | 64.08 |

TABLE 41-continued

| | | | | |
|---|---|---|---|---|
| 3000/6000 | 23.51 | 35.45 | 61.03 | 61.99 |
| Selectivity (wt %): | | | | |
| Metal provided amount: Ni/V = 1000/2000 (ppm) | | | | |
| Conversion (wt %) | 60.00 | 60.00 | 60.00 | 60.00 |
| Yield of each ingredient (wt %) | | | | |
| $H_2$ | 0.35 | 0.43 | 0.20 | 0.15 |
| C1–2 | 0.84 | 0.96 | 0.83 | 0.76 |
| LPG | 12.50 | 11.61 | 12.27 | 12.26 |
| GASO | 43.81 | 43.50 | 44.78 | 44.97 |
| LCO | 27.97 | 29.34 | 29.78 | 29.63 |
| HCO+ | 12.03 | 10.66 | 10.22 | 10.37 |
| COKE | 2.50 | 3.50 | 1.92 | 1.86 |
| RON | 89.37 | 89.41 | 89.06 | 89.58 |
| Selectivity (wt %): | | | | |
| Metal provided amount: Ni/V = 3000/6000 (ppm) | | | | |
| Conversion (wt %) | 60.00 | 60.00 | 60.00 | 60.00 |
| Yield of each ingredient (wt %) | | | | |
| $H_2$ | — | — | 0.33 | 0.36 |
| C1–2 | — | — | 0.91 | 0.91 |
| LPG | — | — | 12.93 | 12.62 |
| GASO | — | — | 43.38 | 43.77 |
| LCO | — | — | 27.79 | 26.68 |
| HCO+ | — | — | 12.21 | 13.32 |
| COKE | — | — | 2.45 | 2.34 |
| RON | — | — | 89.52 | 89.81 |

| Catalyst name | | | | |
|---|---|---|---|---|
| | C4 | C5 | C6 | C7 |
| | Metal deactivator name | | | |
| | MC-3 | MC-4 | MC-5 | MC-6 |

| | | | | |
|---|---|---|---|---|
| Conversion (wt %): | | | | |
| Catalyst/oil | 3 | 3 | 3 | 3 |
| Metal provided amount: | | | | |
| Ni/V (ppm) | | | | |
| 0/0 | 67.33 | 67.80 | 67.36 | 67.45 |
| 1000/2000 | 65.97 | 66.14 | 64.81 | 63.49 |
| 2000/4000 | 63.89 | 63.83 | 57.65 | 58.40 |
| 3000/6000 | 62.43 | 61.81 | 43.18 | 50.22 |
| Selectivity (wt %): | | | | |
| Metal provided amount: Ni/V = 1000/2000 (ppm) | | | | |
| Conversion (wt %) | 60.00 | 60.00 | 60.00 | 60.00 |
| Yield of each ingredient (wt %) | | | | |
| $H_2$ | 0.16 | 0.15 | 0.22 | 0.26 |
| C1–2 | 0.79 | 0.85 | 0.81 | 0.71 |
| LPG | 12.28 | 12.08 | 12.71 | 11.96 |
| GASO | 44.87 | 44.86 | 44.02 | 44.93 |
| LCO | 29.91 | 29.69 | 28.91 | 29.51 |
| HCO+ | 10.09 | 10.31 | 11.09 | 10.49 |
| COKE | 1.90 | 2.06 | 2.24 | 2.14 |
| RON | 89.33 | 89.30 | 89.21 | 89.17 |
| Selectivity (wt %): | | | | |
| Metal provided amount: Ni/V = 3000/6000 (ppm) | | | | |
| Conversion (wt %) | 60.00 | 60.00 | 60.00 | 60.00 |
| Yield of each ingredient (wt %) | | | | |
| $H_2$ | 0.32 | 0.30 | — | — |
| C1–2 | 0.87 | 0.92 | — | — |
| LPG | 12.82 | 12.73 | — | — |
| GASO | 43.64 | 43.67 | — | — |
| LCO | 26.82 | 26.96 | — | — |
| HCO+ | 13.18 | 13.04 | — | — |
| COKE | 2.35 | 2.38 | — | — |
| RON | 89.67 | 89.62 | — | — |

| Catalyst name | | | |
|---|---|---|---|
| | C8 | C9 | C10 |
| | Metal deactivator name | | |
| | MC-7 | MC-8 | MC-9 |

TABLE 41-continued

| | | | |
|---|---|---|---|
| Conversion (wt %): | | | |
| Catalyst/oil | 3 | 3 | 3 |
| Metal provided amount: | | | |
| Ni/V (ppm) | | | |
| 0/0 | 67.55 | 68.32 | 67.75 |
| 1000/2000 | 65.74 | 66.09 | 65.92 |
| 2000/4000 | 63.98 | 63.92 | 64.21 |
| 3000/6000 | 61.54 | 62.07 | 61.84 |
| Selectivity (wt %): | | | |
| Metal provided amount: Ni/V = 1000/2000 (ppm) | | | |
| Conversion (wt %) | 60.00 | 60.00 | 60.00 |
| Yield of each ingredient (wt %) | | | |
| $H_2$ | 0.14 | 0.14 | 0.15 |
| C1–2 | 0.78 | 0.77 | 0.79 |
| LPG | 12.33 | 12.32 | 12.29 |
| GASO | 44.89 | 44.96 | 44.90 |
| LCO | 29.81 | 29.92 | 29.87 |
| HCO+ | 10.21 | 10.13 | 10.28 |
| COKE | 1.84 | 1.76 | 1.72 |
| RON | 89.43 | 89.41 | 89.38 |
| Selectivity (wt %): | | | |
| Metal provided amount: Ni/V = 3000/6000 (ppm) | | | |
| Conversion (wt %) | 60.00 | 60.00 | 60.00 |
| Yield of each ingredient (wt %) | | | |
| $H_2$ | 0.29 | 0.30 | 0.31 |
| C1–2 | 0.90 | 0.91 | 0.92 |
| LPG | 12.58 | 12.69 | 12.49 |
| GASO | 43.66 | 43.87 | 43.91 |
| LCO | 28.09 | 27.97 | 27.92 |
| HCO+ | 12.30 | 12.21 | 12.12 |
| COKE | 2.18 | 2.05 | 2.33 |
| RON | 89.75 | 89.67 | 89.52 |

6. Bench-Scale Plant Activity Test Evaluation

A bench-scale plant comprising a circulating fluidized-bed reactor equipped with a reaction vessel and a catalyst regenerator was used to conduct a test for evaluating the activity of catalysts.

Prior to the test, Catalysts (Base 2, C3, C8 and C9) were subjected to the following circulating simulated equilibration.

As a feedstock oil was used the desulfurized vacuum distillation gas oil shown in Table 6. The test conditions used are as follows.

The test was conducted under conditions of a catalyst/hydrocarbon oil (weight ratio) of each of 6, 8, 10 and 12, and the results were compared to evaluate the activity.

Reaction temperature: 500° C.

Catalyst/hydrocarbon oil weight ratio: 6, 8, 10, 12

Catalyst circulation amount: 60 g/min

Circulating Simulated Equilibration:

The method and apparatus described in JP-A-11–179192 (Japanese Patent Application No. 352940/1997) were used. A fresh catalyst or a mixed catalyst composed of a fresh catalyst and a metal-provided catalyst was heated to 775° C. and burned/steam-treated in an atmosphere of 50% air and 50% steam (heating/burning/stream treatment step). Thereafter, the mixed catalyst was cooled to room temperature, and a metal solution was atomized with nitrogen gas and adhered to the catalyst. The catalyst was dried at 250° C. and the solvent vapor was separated with stripping with nitrogen gas (stripping step). The operation was repeated for 6 hours per day over 10 days.

Standard Conditions:

A treatment was conducted under the same conditions as in the circulating simulated equilibration described above, except that the average provided-amounts of nickel and vanadium were regulated to 2,500 and 5,000 ppm by weight, respectively, and the average steam treatment period was changed to 20 hours.

Catalyst Life Doubling Conditions:

A treatment was conducted under the same conditions as the standard conditions, except that the average provided amounts of nickel and vanadium were regulated to 5,000 and 10,000 ppm by weight, respectively, and the average steam treatment period was changed to 40 hours.

In the treatment conducted under the standard conditions and that conducted under the catalyst life doubling conditions, the metal sources used were naphthenic acid compounds diluted with toluene as in the Mitchell method.

TABLE 6

Hydrocarbon oils test d: vacuum distillation gas oil

|  | Sample 3 |
|---|---|
| Density 15° C. g/cm³ | 0.9094 |
| Vacuum distillation |  |
| IBP | 330 |
| 5% ° C. | 366 |
| 10% ° C. | 382 |
| 20% ° C. | 406 |
| 30% ° C. | 424 |
| 40% ° C. | 443 |
| 50% ° C. | 465 |
| 60% ° C. | 488 |
| 70% ° C. | 518 |
| 80% ° C. | 553 |
| End point ° C. | 575 |
| Total distillate amount % | 85.0 |
| Residue amount % | 15.0 |
| Loss % | 0 |
| Pour point ° C. | 20 |
| Dynamic viscosity 50° C. mm²/S | 56.22 |
| Nitrogen content (chemiluminescence method) wt % | 0.089 |
| Sulfur content (X-ray method) wt % | 0.20 |
| Refractive index 70 nD | 1.487 |
| Density 70° C. g/cm³ | 0.8709 |
| Molecular weight (calculated from viscosity) | 498 |
| Asphaltene (UOP) wt % | 0.66 |
| n-d-m (70° C.) % CA | 16.6 |
| % CN | 16.0 |
| % CP | 67.4 |
| Aniline point (U-tube method) ° C. | 95.1 |
| Dynamic viscosity 75° C. mm²/S | — |
| Dynamic viscosity 100° C. mm²/S | 10.250 |
| Basic nitrogen wt % | 0.0181 |
| Bromine number gBr₂/100 g | 5.4 |
| Hydrogen content wt % | 12.61 |
| Carbon residue content wt % | 2.23 |

TABLE 7

| | Catalyst name | | | |
|---|---|---|---|---|
| | Base 2 | C2 | C8 | C9 |
| | | Metal deactivator name | | |
| | — | MC-2 | MC-7 | MC-8 |
| Conversion (wt %): | | | | |
| Catalyst/oil | 8 | 8 | 8 | 8 |
| Average metal provided amount: | | | | |
| Ni/V (ppm) | | | | |
| 2500/5000 | 60.80 | 67.43 | 67.52 | 67.21 |
| 5000/10000 | 40.10 | 66.50 | 65.82 | 65.56 |
| Selectivity (wt %): | | | | |
| Average metal provided amount: Ni/V = 2500/5000 (ppm) | | | | |
| Average steam treatment period: 20 hr | | | | |
| Conversion (wt %) | 60.00 | 60.00 | 60.00 | 60.00 |

TABLE 7-continued

| | Catalyst name | | | |
|---|---|---|---|---|
| | Base 2 | C2 | C8 | C9 |
| | | Metal deactivator name | | |
| | — | MC-2 | MC-7 | MC-8 |
| Yield of each ingredient (wt %) | | | | |
| H₂ | 0.23 | 0.14 | 0.13 | 0.13 |
| C1–2 | 0.89 | 0.87 | 0.88 | 0.87 |
| LPG | 10.93 | 10.95 | 10.82 | 10.79 |
| GASO | 41.24 | 42.35 | 42.35 | 42.41 |
| LCO | 21.37 | 22.98 | 23.21 | 22.93 |
| HCO+ | 19.08 | 17.32 | 17.38 | 17.68 |
| COKE | 6.26 | 5.39 | 5.23 | 5.19 |
| RON | 88.80 | 88.79 | 88.78 | 88.79 |
| Selectivity (wt %): | | | | |
| Average metal provided amount: Ni/V = 5000/10000 (ppm) | | | | |
| Average steam treatment period: 40 hr | | | | |
| Conversion (wt %) | 60.00 | 60.00 | 60.00 | 60.00 |
| Yield of each ingredient (wt %) | | | | |
| H₂ | 0.31 | 0.25 | 0.23 | 0.22 |
| C1–2 | 0.73 | 1.00 | 0.91 | 0.92 |
| LPG | 17.70 | 11.34 | 10.90 | 11.12 |
| GASO | 35.86 | 41.65 | 42.21 | 42.34 |
| LCO | 17.25 | 23.38 | 23.12 | 23.46 |
| HCO+ | 20.25 | 16.26 | 16.62 | 16.12 |
| COKE | 7.90 | 6.12 | 6.01 | 5.82 |
| RON | 88.80 | 89.50 | 89.34 | 89.45 |

While the invention has been described in detail and with reference to specific embodiments thereof, it will be apparent to one skilled in the art that various changes and modifications can be made therein without departing from the spirit and scope thereof.

This application is based on Japanese patent application No. 2000-257669, filed on Aug. 28, 2000 and Japanese patent application No. 2001-246232, filed on Aug. 14, 2001, the contents thereof being hereby incorporated by reference.

INDUSTRIAL APPLICABILITY

As described above, the catalyst of the present invention has reduced selectivity to hydrogen and coke and can yield a gasoline and an LCO fraction in high yields without lowering the octane number. In addition, the catalyst can retain these performances on a high level over long. The FCC catalyst can have a greatly improved metal endurance life (at least 3 times the life of Standard Catalyst A). (When a feedstock oil containing metals in an amount at least 3 times larger than the metal amount in current feedstock oils is treated, the catalyst of the present invention can have the same performance as current catalysts, i.e., Standard Catalyst A.)

According to the method of the present invention using the catalyst, a low-quality heavy hydrocarbon oil can be cracked by FCC at low cost.

What is claimed is:

1. A catalyst for fluidized catalytic cracking of a heavy hydrocarbon oil, which comprises:

(1) a particulate catalyst obtained by evenly dispersing a crystalline aluminosilicate zeolite in an inorganic oxide matrix, and (2) a particulate metal deactivating additive in which calcium carbonate with an average particle diameter of from 0.001 to 30 μm is dispersed in an inorganic oxide matrix whereby the content of said calcium carbonate is from 30 to 70 wt % on a dry basis.

2. The catalyst for fluidized catalytic cracking of a heavy hydrocarbon oil according to claim 1, wherein said particulate metal deactivating additive has an average particle diameter of from 50 to 90 μm, a bulk density of from 0.3 to 1.2 g/ml and an oil absorption of from 0.1 cc/g or more.

3. A catalyst for fluidized catalytic cracking of a heavy hydrocarbon oil according to claim 1, wherein the calcium carbonate has an average particle diameter of from 0.1 to 10 μm.

* * * * *